US006835330B2

(12) United States Patent
Nishino et al.

(10) Patent No.: US 6,835,330 B2
(45) Date of Patent: Dec. 28, 2004

(54) IRON-CARBON COMPOSITE, CARBONACEOUS MATERIAL COMPRISING SAID IRON-CARBON COMPOSITE AND PROCESS FOR PREPARING THE SAME

(75) Inventors: Hitoshi Nishino, Kawachinagano (JP); Haruyuki Nakaoka, Kishiwada (JP); Katsuhide Okimi, Sakai (JP); Ryoichi Nishida, Ikoma (JP); Takeo Matsui, Yawata (JP)

(73) Assignee: Osaka Gas Company Limited, Osaka (JP)

( * ) Notice: Subject to any disclaimer, the term of this patent is extended or adjusted under 35 U.S.C. 154(b) by 165 days.

(21) Appl. No.: 10/212,090

(22) Filed: Aug. 6, 2002

(65) Prior Publication Data

US 2003/0175462 A1 Sep. 18, 2003

(30) Foreign Application Priority Data

Mar. 15, 2002 (JP) .......................................... 2002-071937

(51) Int. Cl.[7] ........................... H01B 1/04; C01B 31/02; H01J 1/30
(52) U.S. Cl. ..................... 252/503; 252/504; 423/447.1; 423/447.3; 423/445 R; 313/310; 313/311
(58) Field of Search .............................. 252/503, 504, 252/506; 423/445 R, 447.1, 447.3; 313/310, 311

(56) References Cited

U.S. PATENT DOCUMENTS 6,664,728 B2 * 12/2003 Pavlovsky et al. .......... 313/495

FOREIGN PATENT DOCUMENTS

| JP | 2546114 | 8/1996 |
|----|---------|--------|
| JP | 9-142819 | 6/1997 |
| JP | 2000-204471 | 7/2000 |
| JP | 2001-89116 | 4/2001 |
| JP | 2001-342014 | 12/2001 |

OTHER PUBLICATIONS

H.W. Kroto et al.; "Enhanced magnetic coercivities in Fe nanowires"; Applied Physics Letters, 1999, vol. 75, No. 21, pp 3363–3365.

C.N.R. Rao et al.; "Large aligned–nanotube bundles from ferrocene pyrolysis"; J. Chem. Soc. Chem. Commun., 1998, pp1525–1526.

* cited by examiner

Primary Examiner—Mark Kopec
(74) Attorney, Agent, or Firm—Armstrong, Kratz, Quintos, Hanson & Brooks, LLP

(57) ABSTRACT

Disclosed are an iron-carbon composite in which 10 to 90% of the internal space of a nanoflake carbon tube or a nested multi-walled carbon nanotube is filled with iron carbide or iron; a carbonaceous material containing such iron-carbon composites; and a process for preparing the same. The iron-carbon composite is useful for electron emitting materials and other applications.

22 Claims, 10 Drawing Sheets

US 6,835,330 B2

IRON-CARBON COMPOSITE, CARBONACEOUS MATERIAL COMPRISING SAID IRON-CARBON COMPOSITE AND PROCESS FOR PREPARING THE SAME

TECHNICAL FIELD

This invention relates to an iron-carbon composite containing an iron compound such as iron carbide or iron, and to a carbonaceous material comprising said iron-carbon composites.

BACKGROUND ART

Carbon nanotubes are a hollow carbon substance in which a graphite sheet (that is, a graphene sheet or carbon atomic plane with a graphite structure) is rolled into a tubular shape. The diameters of these tubes are on the nanometer scale, and the walls are of graphitic structure. These carbon nanotubes were discovered in 1991 by Dr. Sumio Iijima. Carbon nanotubes in which the wall structure consists of a single graphite sheet closed in a tubular shape are called single-walled carbon nanotubes, while those consisting of a plurality of graphite sheets each closed into a tubular shape and nested one within the other are called nested multi-walled carbon nanotubes.

Tubes that are similar to, but different in carbon wall structure from, the nested multi-walled carbon nanotubes, have been reported, in which the graphite wall structure is in a scroll form.

In an effort to improve the electrical characteristics in the field of electrical conductors and the like and the magnetic characteristics, there have been attempts in recent years to encapsulate a metal within the internal spaces defined by the tube walls of these carbon nanotubes (hereinafter sometimes referred to as "CNTs") and so forth.

For example, Japanese Patent No. 2,546,114 discloses a foreign substance-containing carbon nanotube in which a substance other than carbon, such as a metal, is encapsulated in the cavity at the center of a nested multi-walled carbon nanotube. This foreign substance-containing carbon nanotube is prepared by vapor depositing a substance other than carbon at the end of a nested multi-walled carbon nanotube closed by a cap, either during or after the removal of the cap, and introducing the substance by thermal diffusion into the cavity located at the center of the carbon nanotube from the end of the carbon nanotube.

Japanese Unexamined Patent Publication No. 1997-142819 discloses carbon tubes each composed of a carbon nanotube having a diameter of 10 nm to 1 $\mu$m and a length of 1 to 100 $\mu$m and a foreign substance contained in the carbon nanotube. These foreign substance-containing carbon nanotubes are prepared using an inorganic substance having substantially straight channels as a template, either by coating the channel walls with an organic substance and carbonizing the organic substance by heating, or by subjecting a gaseous hydrocarbon to vapor phase carbonization inside the channels so as to deposit a thin film of carbon, thereby forming carbon tubes, and then bringing a solution or a melt of said foreign substance into contact with the tubes to insert the foreign substance into the cavities of the carbon nanotubes (and removing the inorganic substance by dissolving it before or after the insertion).

Japanese Unexamined Patent Publication No.2000-204471 discloses minute metal wires each composed of a wire material having a diameter of 1 to 100 nm and having a major axis length to diameter ratio of at least 50, and more particularly discloses a minute metal wire covered with a tube made of carbon. This minute metal wire covered with a carbon tube is prepared by substantially the same process as that disclosed in the above-mentioned Japanese Unexamined Patent Publication No. 1997-142819. The process comprises the first step of forming, in an inorganic substance having substantially linear channels, tubular carbon on the channel walls, and the second step of depositing metal in the interior of this tubular carbon.

However, the above-mentioned prior art processes require at least two steps of first forming a carbon tube and then inserting a foreign substance, so that the processes are complicated in terms of management and control of the steps, and entails low productivity. Furthermore, the preparation processes disclosed in the above-mentioned Japanese Unexamined Patent Publications Nos. 1997-142819 and 2000-204471 require a step of removing the inorganic substance used as a template by dissolving it.

Also, so far no process has been developed with which a composite comprising a metal, and particularly iron or an iron compound, contained in the internal space defined by the carbon wall of a tubular carbon material, such as carbon nanotube, can be obtained in amounts over the milligram scale. Consequently, practical research has not been done on such carbon-metal composites in which a metal or the like is contained in the internal space of a tubular carbon material.

The primary object of the present invention is to provide a composite in which iron or an iron compound is contained within a considerable portion of the internal space of a carbon tube, a carbonaceous material containing such composites, and processes for preparing the same.

DISCLOSURE OF THE INVENTION

The inventors conducted research in view of the status of the prior art as outlined above, and consequently discovered the following.

1) A carbon material comprising iron-carbon composites each composed of a carbon tube and iron or iron carbide contained in the internal space of the tube can be prepared in a single step by (1) heating an iron halide to 600 to 900° C. in a reaction furnace in which the pressure therein has been adjusted to $10^{-5}$ Pa to 200 kPa in an inert gas atmosphere and the oxygen concentration in the reaction furnace has been adjusted such that the ratio B/A is between $1 \times 10^{-10}$ and $1 \times 10^{-1}$ wherein A is the reaction furnace volume (liters) and B is the amount of oxygen (Ncc), and (2) introducing an inert gas into the reaction furnace, and at a pressure of between $10^{-5}$ Pa and 200 kPa, introducing thereinto a pyrolyzable carbon source and performing a heat treatment at 600 to 900° C.

2) Tubes composed of carbon, obtained by controlling the cooling rate to a specified range in the cooling step after the above-mentioned step (2), are carbon tubes composed of a group of graphite sheets, which seem to be made up of a plurality of (usually many) flake-like graphite sheets formed into a patchwork or papier-mâché-like structure. In this specification, these carbon tubes will be referred to as "nanoflake carbon tubes". These nanoflake carbon tubes are tubular carbon materials that are completely different in structure from single-walled carbon nanotubes in which a single graphite sheet is closed into a cylindrical form, or from concentric cylindrical or nested multi-walled carbon nanotubes in which a plurality of graphite sheets are each closed into a cylindrical form.

3) As for the internal spaces within the nanoflake carbon tubes (that is, the space defined by the walls of the nanoflake carbon tubes), a considerable portion, particularly 10 to 90%, of the space is filled with iron or iron carbide, forming an iron-carbon composite.

4) The tube composed of carbon, obtained by performing a heat treatment in an inert gas and cooling at a specific cooling rate following the above-mentioned step (2), is a multi-walled carbon nanotube of a nested structure. A considerable portion of the internal space of the multi-walled carbon nanotube, particularly 10 to 90% of this space, is filled with iron or iron carbide, forming an iron-carbon composite.

5) The above composites, each composed of a carbon tube selected from the group consisting of nanoflake carbon tube and nested multi-walled carbon nanotube and a metal (particularly iron or iron carbide) contained in the carbon tube, are useful as an electron emitting material that can emit electrons at a high current density under a low electrical field.

The present invention was achieved by carrying out further investigation on the basis of these findings, and provides the following iron-carbon composite and its preparation process.

Item 1 An iron-carbon composite composed of (a) a carbon tube selected from the group consisting of nanoflake carbon tubes and nested multi-walled carbon nanotubes and (b) iron carbide or iron, wherein 10 to 90% of the internal space of the carbon tube is filled with the iron carbide or iron.

Item 2 The iron-carbon composite according to Item 1 above, which has a straight shape, an outside diameter of 1 to 100 nm, and a carbon wall thickness of 49 nm or less, the carbon wall thickness being substantially uniform over the entire length, and has an aspect ratio L/D of 5 to 10,000 wherein L is the length and D is the outside diameter.

Item 3 The iron-carbon composite according to Item 1 or 2 above, wherein the mean spacing between the hexagonal carbon layers (d002) is 0.34 nm or less, as determined by applying X-ray diffractometry to the wall of the carbon tube that makes up the iron-carbon composite.

Item 4 The iron-carbon composite according to any one of Items 1 to 3 above, wherein the carbon tube that makes up the iron-carbon composite is a nanoflake carbon tube.

Item 5 The iron-carbon composite according to any one of Items 1 to 3 above, wherein the carbon tube that makes up the iron-carbon composite is a nested multi-walled carbon nanotube.

Item 6 A carbonaceous material comprising iron-carbon composites composed of (a) carbon tubes selected from the group consisting of nanoflake carbon tubes and nested multi-walled carbon nanotubes and (b) iron carbide or iron, wherein 10 to 90% of the internal space each of the carbon tubes is filled with the iron carbide or iron.

Item 7 The carbonaceous material according to Item 6 above, wherein the ratio R of Ia/Ib is 0.35 to 5 as determined by powder X-ray diffractometry in which the carbonaceous material is irradiated with CuKα X-ray over an irradiation area of at least 25 mm² per mg of the carbonaceous material, wherein Ia is the integrated intensity of the peak which has the strongest integrated intensity among the peaks appearing in the range of 40°<2θ<50° assigned to the iron or iron carbide contained in the carbon tubes, and Ib is the integrated intensity of the peak appearing in the range of 26°<2θ<27° assigned to the mean spacing between the hexagonal carbon layers (d002) of the carbon tubes.

Item 8 The carbonaceous material according to Item 6 or 7 above, wherein the iron-carbon composites have straight shapes, outside diameters of 1 to 100 nm, carbon wall thicknesses of 49 nm or less, the carbon wall thicknesses being substantially uniform over the entire lengths, and also have aspect ratios L/D in the range of 5 to 10,000 where L is the length and D is the outside diameter.

Item 9 The carbonaceous material according to any one of Items 6 to 8 above, wherein the mean spacing between the hexagonal carbon layers (d002) is 0.34 nm or less, as determined by applying X-ray diffractometry to the walls of the carbon tubes that make up the iron-carbon composites.

Item 10 The carbonaceous material according to any one of Items 6 to 9 above, wherein the carbon tubes that make up the iron-carbon composites are nanoflake carbon tubes.

Item 11 The carbonaceous material according to any one of Items 6 to 9 above, wherein the carbon tubes that make up the iron-carbon composites are nested multi-walled carbon nanotubes.

Item 12 A process for producing a carbonaceous material comprising iron-carbon composites composed of (a) carbon tubes selected from the group consisting of nanoflake carbon tubes and nested multi-walled carbon nanotubes and (b) iron carbide or iron, wherein 10 to 90% of the internal space of each carbon tube is filled with the iron carbide or iron, said process comprising the steps of:

(1) heating an iron halide to a temperature of 600 to 900° C. in a reaction furnace in which the pressure has been adjusted to $10^{-5}$ Pa to 200 kPa in an inert gas atmosphere and the oxygen concentration in the reaction furnace has been adjusted such that the ratio B/A is $1\times10^{-10}$ to $1\times10^{-1}$ wherein A is the reaction furnace volume (liters) and B is the oxygen quantity (Ncc); and (2) introducing an inert gas to the reaction furnace, and at a pressure of between $10^{-5}$ Pa and 200 kPa, introducing a pyrolyzable carbon source and performing a heat treatment at 600 to 900° C.

Item 13 The process according to Item 12 above, which comprises, after the heat treatment in step (2), cooling the reaction furnace to 500° C. at a rate of 50 to 2000° C./h to thereby produce a carbonaceous material comprising iron-carbon composites composed of nanoflake carbon tubes and iron carbide or iron that fills 10 to 90% of the internal space of each tube.

Item 14 The process according to Item 12 above, which, after the heat treatment step in step (2), comprises the steps of:

(3) replacing the atmosphere inside the reaction furnace with an inert gas while the temperature in step (2) is maintained;

(4) elevating the temperature in the reaction furnace, the atmosphere of which has been replaced with the inert gas, to 950 to 1500° C.;

(5) maintaining the final temperature at the end of the temperature elevation until nested multi-walled carbon nanotubes are produced; and (6) cooling the temperature in the reaction furnace at a rate of 50° C./h or lower, to thereby produce a carbonaceous material comprising iron-carbon composites composed of nested multi-walled carbon nanotubes and iron carbide or iron that fills 10 to 90% of the spaces inside the tubes.

Item 15 The process according to Item 12 above, wherein the heat treatment in step (2) is performed in the presence of an organic iron complex.

Item 16 The process according to Item 15 above, wherein the organic iron complex is ferrocene or an iron carbonyl complex.

Item 17 The process according to any one of Items 12 to 16 above, wherein the iron halide is an iron chloride.

Item 18 The process according to Item 17 above, wherein the iron chloride is at least one member selected from the group consisting of $FeCl_2$, $FeCl_3$, $FeCl_2.4H_2O$ and $FeCl_3.6H_2O$.

Item 19 The process according to any one of Items 12 to 18 above, wherein the pyrolyzable carbon source is at least one member selected from the group consisting of aromatic hydrocarbons having 6 to 12 carbon atoms, saturated aliphatic hydrocarbons having 1 to 10 carbon atoms, and unsaturated aliphatic hydrocarbons having 2 to 5 carbon atoms.

Figure 1:
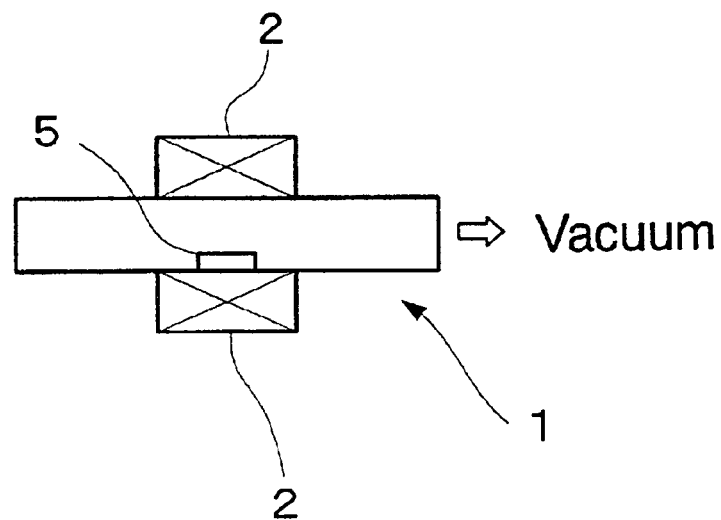
FIG. 1 is a schematic diagram illustrating an example of the production apparatus used to carry out the production process of the present invention.

The numerals used in the drawings have the following meanings.

1 reaction furnace
2 heating apparatus
3 heating apparatus
10 cathode substrate
20 anode electrode
30 transparent glass
40 vacuum vessel
50 electron emitting material
100 TEM image in lengthwise direction of nanoflake carbon tube
110 substantially linear graphene sheet image
200 TEM image of a cross section substantially perpendicular to the lengthwise direction of a nanoflake carbon tube
210 arc-shaped graphene sheet image
300 image of linear graphene sheet continuous over the entire length of a nested multi-walled carbon nanotube
400 TEM image of a cross section substantially perpendicular to the lengthwise direction of a nested multi-walled carbon nanotube

DETAILED DESCRIPTION OF THE INVENTION

Iron-carbon Composite of the Present Invention

The iron-carbon composite according to the present invention is composed of (a) a carbon tube selected from the group consisting of nanoflake carbon tubes and nested multi-walled carbon nanotubes and (b) iron carbide or iron. Rather than all of the internal spaces (i.e., the spaces defined by the tube walls) of the carbon tubes being filled, a part of each space, more specifically about 10 to 90%, particularly about 30 to 80%, and preferably about 40 to 70%, of the space is filled with iron carbide or iron.

In the iron-carbon composite of the present invention, the carbon portion becomes nanoflake carbon tubes when cooling is carried out at a specific rate after steps (1) and (2) have been carried out, or becomes nested multi-walled carbon nanotubes when a heat treatment in an inert gas atmosphere and cooling at a specific rate are carried out after steps (1) and (2) have been carried out.

<(a-1) Nanoflake Carbon Tubes>

Figure 7:
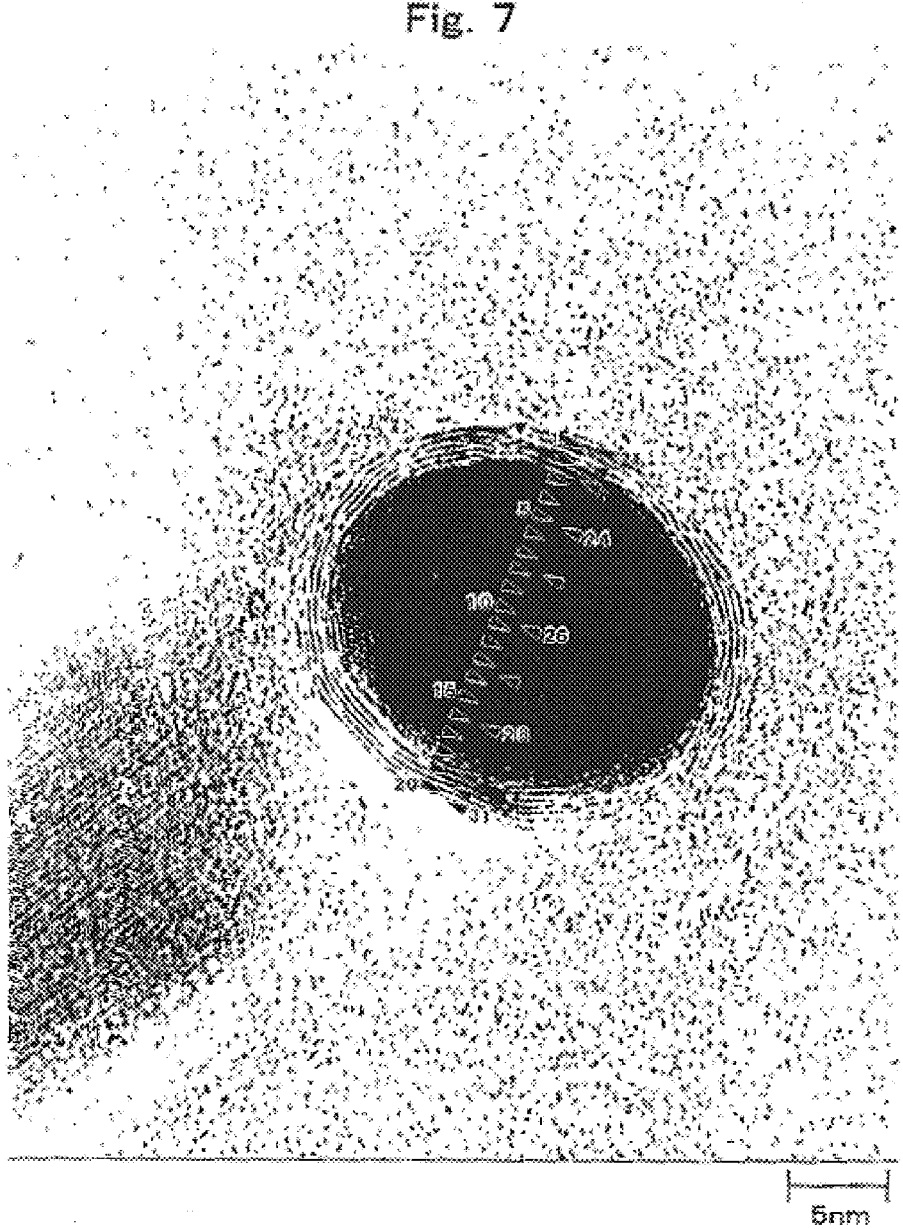
FIG. 7 is a transmission electron microscope (TEM) photograph of one of the iron-carbon composites obtained in Example 1, which has been cut crosswise. The black triangles (▲) shown in the photograph of FIG. 7 indicate EDX measurement points for elemental analysis.

The iron-carbon composite of the present invention, which is composed of a nanoflake carbon tube and iron carbide or iron, is typically cylindrical in shape. FIG. 7 shows a transmission electron microscope (TEM) photograph of a cross section perpendicular to the lengthwise direction of this cylindrical iron-carbon composite (obtained in Example 1), and FIG. 3 shows a TEM photograph of the side thereof.

Figure 10:
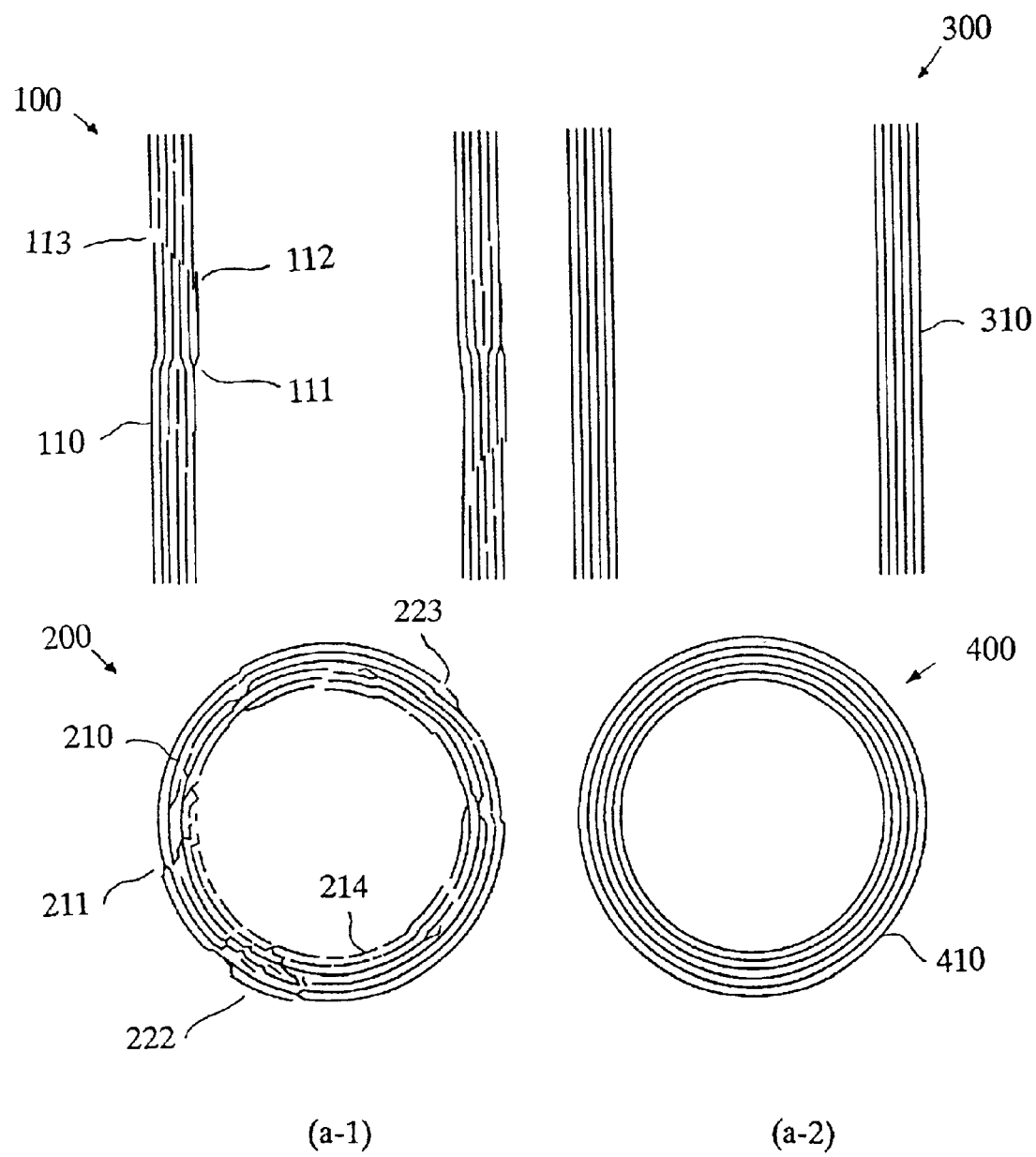
FIG. 10 shows schematic diagrams of TEM images of carbon tubes, wherein (a-1) is a schematic diagram of a TEM image of a cylindrical nanoflake carbon tube, and (a-2) is a schematic diagram of a TEM image of a nested multi-walled carbon nanotube.

FIG. 10 (a-1) is a schematic diagram of a TEM image of such a cylindrical nanoflake carbon tube. In FIG. 10 (a-1), 100 schematically shows a TEM image of the lengthwise direction of the nanoflake carbon tube, while 200 schematically shows a diagram of a TEM image of a cross section substantially perpendicular to the lengthwise direction of the nanoflake carbon tube.

As is clear from FIG. 7 and 200 in FIG. 10 (a-1), when a cross section perpendicular to the lengthwise direction is observed by TEM, the nanoflake carbon tube that makes up the iron-carbon composite of the present invention is such that numerous arc-shaped graphene sheet images are grouped in a multi-walled tubular form, but as indicated by, e.g., 210 and 214, the individual graphene sheet images do not form completely closed, continuous rings, and instead form non-continuous rings that are broken in places. Some of the graphene sheet images may be branched, as indicated by 211. At the non-continuous area, a plurality of arc-shaped TEM images that make up one non-continuous ring may be such that the layer structure is partially disturbed as indicated by 222 in FIG. 10 (a-1), or there may be gaps between adjacent graphene sheet images as indicated by 223. However, the numerous arc-shaped graphene sheet images observed by TEM, taken together, form a multi-walled tube structure.

Figure 3:
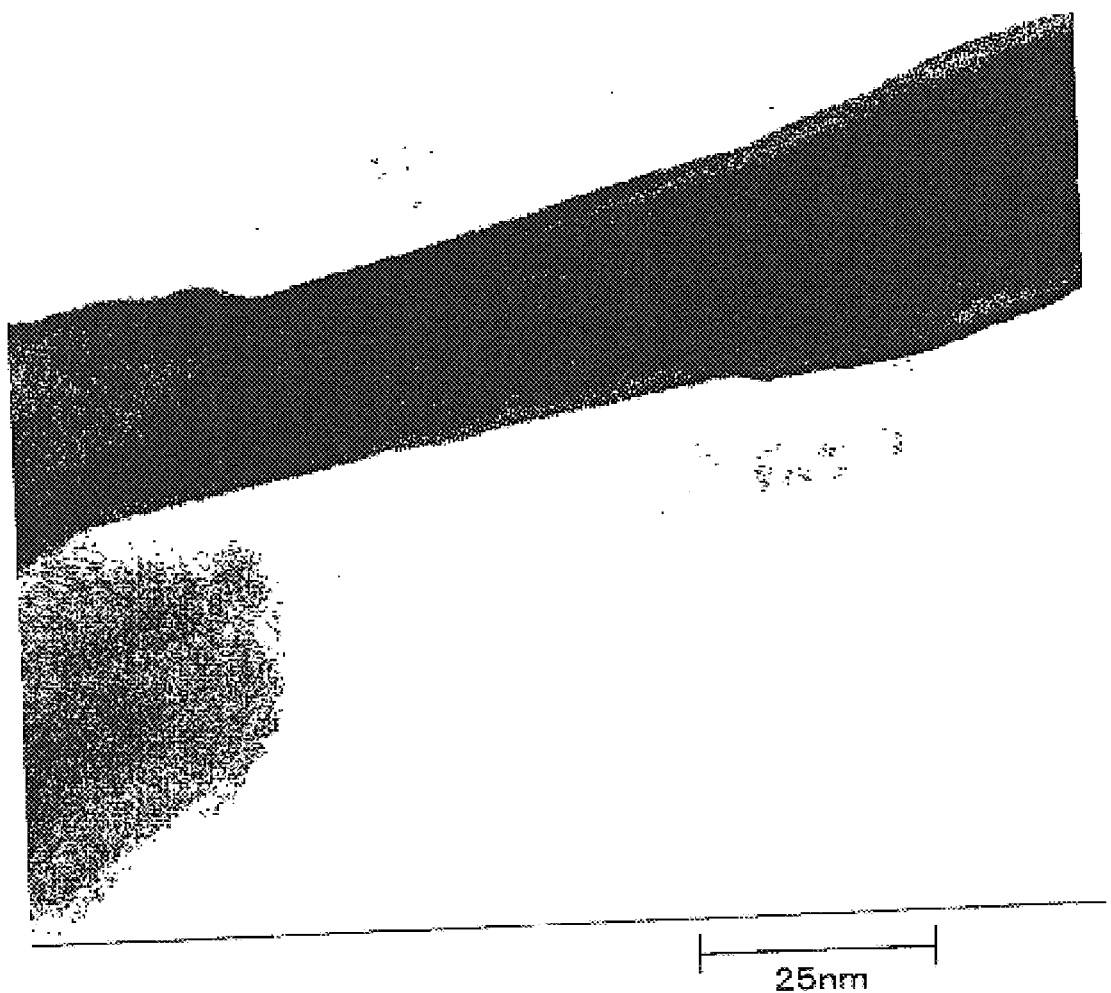
FIG. 3 is a transmission electron microscope (TEM) photograph of one of the iron-carbon composites that make up the carbonaceous material obtained in Example 1.

As is clear from FIG. 3 and 100 in FIG. 10 (a-1), when the nanoflake carbon tube is viewed in the lengthwise direction by TEM, it can be seen that numerous substantially linear graphene sheet images are arranged in layers substantially parallel to the lengthwise direction of the iron-carbon composite of the present invention, but the individual graphene sheet images 110 are not continuous over the entire length of the iron-carbon composite, and are instead broken in places. Some of the graphene sheet images may be branched, as indicated by 111 in FIG. 10 (a-1). Among the TEM images arranged in layers at the non-continuous points, the TEM image of a non-continuous layer may at least partially overlap an adjacent graphene sheet image as indicated by 112 in FIG. 10 (a-1), or it may be slightly apart from an adjacent graphene sheet image as indicated by 113, but the numerous substantially linear TEM images, taken together, form a multi-walled structure.

Such a structure of the nanoflake carbon tubes of the present invention greatly differs from that of conventional multi-walled carbon nanotubes. Specifically, a nested multi-walled carbon nanotube has a tube structure (a concentric cylindrical or nested structure) in which, as indicated by 400 in FIG. 10 (a-2), the TEM image of a cross section perpendicular to the lengthwise direction thereof is in a concentric circular form comprising perfectly circular TEM images as indicated by 410, and as indicated by 300 in FIG. 10 (a-2), linear graphene sheet images 310 which are continuous over the entire length in the lengthwise direction are arranged in parallel.

In view of the above, although the details are not yet fully clarified, the nanoflake carbon tube that makes up the iron-carbon composite of the present invention appears to be such that numerous flaky graphene sheets are stacked in a patchwork or papier-mâché-like structure and, taken together, form a tube.

The iron-carbon composite of the present invention, composed of a nanoflake carbon tube and iron carbide or iron contained in the internal space of the tube, greatly differs in carbon tube structure from the composite disclosed in Japanese Patent No. 2,546,114 in which a metal is contained in the internal space of a nested multi-walled carbon nanotube; and is therefore a novel carbon material unknown in the past.

When the nanoflake carbon tube that makes up the iron-carbon composite of the present invention is observed by TEM, with respect to the numerous substantially linear graphene sheet images arranged in the lengthwise direction thereof, the length of the individual graphene sheet images is usually about 2 to 500 nm, and particularly about 10 to 100 nm. Specifically, as indicated by 100 in FIG. 10 (a-1), numerous TEM images of the substantially linear graphene sheets indicated by 110 are grouped together to constitute a TEM image of the wall of a nanoflake carbon tube, and the length of the individual substantially linear graphene sheet images is usually about 2 to 500 nm, and particularly about 10 to 100 nm.

The carbon portion, i.e., the wall of the nanoflake carbon tube that makes up the iron-carbon composite of the present invention, is composed of numerous flake-like graphene sheets which are arranged in the lengthwise direction to form a tube as a whole as discussed above, and is of a graphitic structure in which the mean spacing between the hexagonal carbon layers (d002) is 0.34 nm or less as determined by X-ray diffractometry.

The thickness of the wall composed of the nanoflake carbon tube of the iron-carbon composite of the present invention is 49 nm or less, particularly about 0.1 to 20 nm, preferably about 1 to 10 nm, and is substantially uniform over the entire length.

<(a-2) Nested Multi-walled Carbon Nanotubes>

The carbon tube that makes up the iron-carbon composite obtained by performing a specific heat treatment after steps (1) and (2) have been carried out is a nested multi-walled carbon nanotube.

The nested multi-walled carbon nanotube thus obtained has a tube structure (a concentric cylindrical or nested structure) in which, as indicated by 400 in FIG. 10 (a-2), the TEM images of a cross section perpendicular to the lengthwise direction thereof are in a concentric circular form comprising perfect circles, and graphene sheet images which are continuous over the entire length are arranged in parallel.

The carbon portion, i.e., the wall composed of the nested multi-walled carbon tube that makes up the iron-carbon composite of the present invention, is of a graphitic structure in which the mean spacing between the hexagonal carbon layers (d002) is 0.34 nm or less as determined by X-ray diffractometry.

The thickness of the wall composed of the nested multi-walled carbon nanotube of the iron-carbon composite of the present invention is 49 nm or less, particularly about 0.1 to 20 nm, preferably about 1 to 10 nm, and is substantially uniform over the entire length.

<(b) Contained Iron Carbide or Iron>

In this Specification, the filling proportion (10 to 90%) of iron carbide or iron present in the internal space of the above-mentioned carbon tube is determined by transmission electron microscope observation of the iron-carbon composite obtained according to the present invention, and is the proportion of the area of an image of the portion filled with iron carbide or iron relative to the area of an image of the space of the carbon tube (that is, the space defined by the wall of the carbon tube).

The iron carbide or iron can be contained in the tubes in various ways, such as the carbon tube internal spaces being continuously filled, or the carbon tube internal spaces being intermittently filled, but basically the spaces are intermittently filled. Therefore, the iron-carbon composite of the present invention may also be called a metal-containing carbon composite, an iron-compound-containing carbon composite, or an iron-carbide- or iron-containing carbon composite.

The iron carbide or iron contained in the iron-carbon composite of the present invention is oriented in the lengthwise direction of the carbon tube, and has high crystallinity, and the proportion of the area of a TEM image of the crystalline iron carbide or iron relative to the area of a TEM image of the region filled with iron carbide or iron (hereinafter referred to as the "crystallinity ratio") is generally about 90 to 100%, and particularly about 95 to 100%.

High crystallinity of the contained iron carbide or iron is clear from the lattice pattern arrangement shown in the TEM image of the contained substance, and is also clear from the distinct diffraction pattern obtained in electron beam diffraction.

The presence of iron carbide or iron as contained in the iron-carbon composite of the present invention can be easily confirmed by electron microscopy and EDX (energy dispersive X-ray analyzer).

<Overall Shape of Iron-carbon Composite>

The iron-carbon composite of the present invention has less curvature and has a straight shape, and has a wall thickness substantially uniform over the entire length, and therefore has a uniform shape over the entire length. This shape is columnar, and mainly cylindrical.

The outside diameter of the iron-carbon composite according to the present invention is usually in the range of about 1 to 100 nm, particularly about 1 to 50 nm, and preferably in the range of about 1 to 30 nm, more preferably in the range of about 10 to 30 nm. The aspect ratio (L/D) of the tube length (L) to its outside diameter (D) is about 5 to 10,000, particularly about 10 to 1000.

The term "straight shape" used to describe the shape of the iron-carbon composite of the present invention is defined as follows. That is, this term refers to shape characteristics such that the ratio W/Wo is at least 0.8, particularly at least 0.9, wherein W is the length of its image viewed when a carbonaceous material containing the iron-carbon composite of the present invention is observed over an area of 200 to 2000 nm square by a transmission electron microscope, and Wo is the length when said image has been extended linearly.

Carbonaceous Material Containing Iron-carbon Composites

The iron-carbon composites of the present invention have the following properties when considered as a bulk material. Specifically, with the present invention, the iron-carbon composites, in which iron or iron carbide fills 10 to 90% of the internal spaces of carbon tubes selected from the group consisting of the above-mentioned nanoflake carbon tubes and nested multi-walled carbon nanotubes, are a bulk material containing numerous iron-carbon composites and are obtained in a large quantity in the form of a material that should also be called a carbonaceous material comprising iron-carbon composites, or an iron carbide- or iron-containing carbonaceous material, as opposed to a minute amount, which can be barely observed by microscopic observation.

Figure 4:
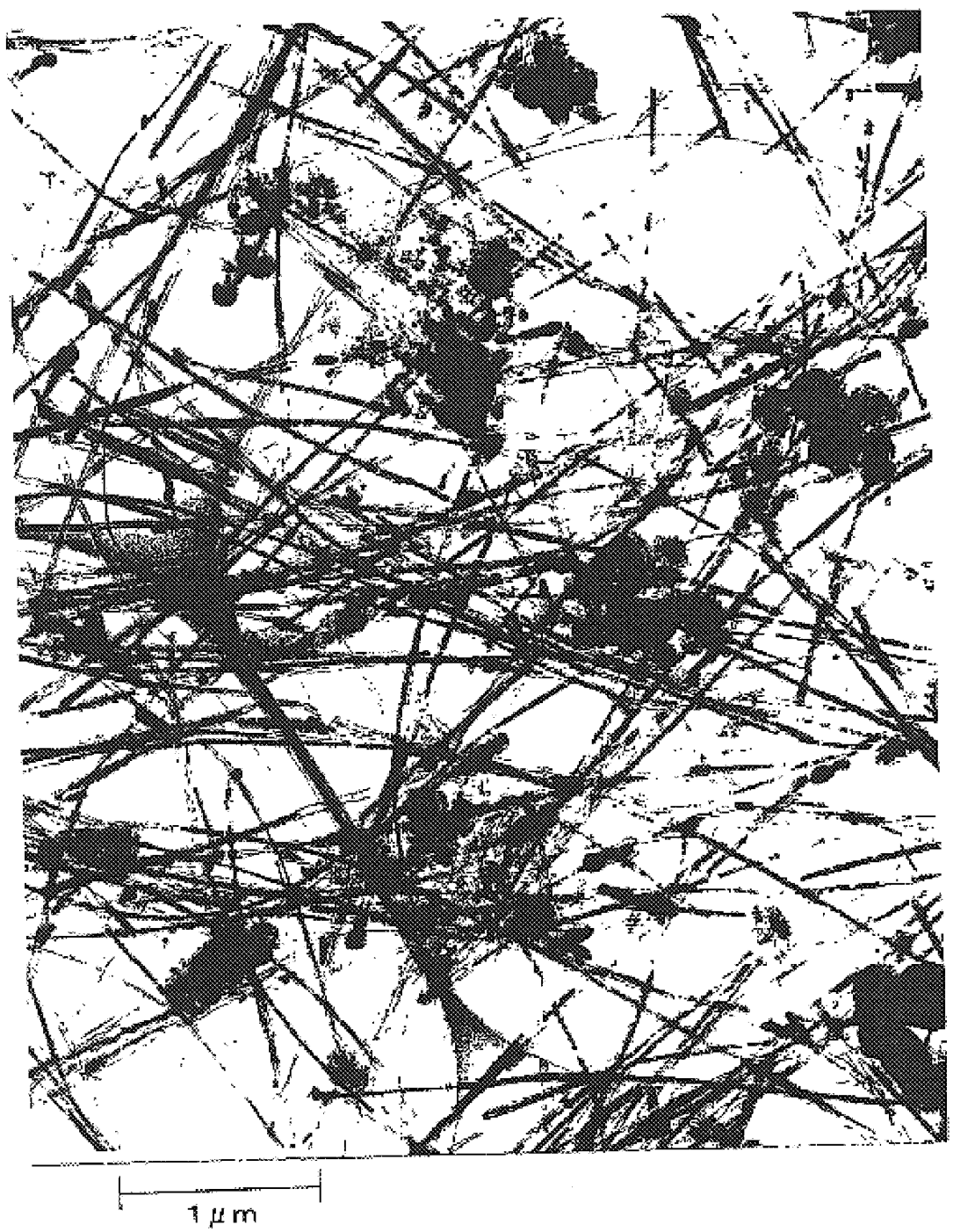
FIG. 4 is a transmission electron microscope (TEM) photograph showing how the iron-carbon composites are present in the carbonaceous material obtained in Example 1.

FIG. 4 is an electron micrograph of the carbonaceous material of the present invention obtained in Example 1 which will be described later, comprising nanoflake carbon tubes and iron carbide contained in the internal spaces of these tubes.

As seen from FIG. 4, in the carbonaceous material comprising the iron-carbon composites of the present invention, iron or iron carbide fills 10 to 90% of the internal spaces (that is, the spaces surrounded by the walls of the carbon tubes) of basically almost all (particularly 99% or more) of the carbon tubes, and usually there are substantially no carbon tubes whose internal spaces are empty. In some cases, however, a minute amount of carbon tubes not containing iron carbide or iron may be contained.

Also, with the carbonaceous material of the present invention, the above-mentioned iron-carbon composites in which iron or iron carbide fills 10 to 90% of the internal spaces of the carbon tubes are the main component, but there may be cases in which soot or other such materials are included besides the iron-carbon composites of the present invention. In such a case, any components other than the iron-carbon composites of the present invention can be removed so as to increase the iron-carbon composite purity in the carbonaceous material of the present invention, and to thereby obtain a carbonaceous material consisting essentially of the iron-carbon composites of the present invention.

Also, unlike prior art materials that could only be observed in minute amounts by microscopic observation, the carbonaceous material containing iron-carbon composites of the present invention can be synthesized in large quantities, and a weight of 1 mg or more can be easily achieved. This material of the present invention can be prepared without limit by scaling up the preparation process of the present invention, which will be described below, or by repeating the preparation a number of times. In general, the carbonaceous material comprising iron-carbon composites of the present invention can be easily obtained in an amount of about 1 mg to 100 g, particularly about 10 to 1000 mg, even at a laboratory level in which the reaction furnace volume is about 1 liter.

In the powder X-ray diffraction measurement of the carbonaceous material of the present invention in which the carbonaceous material is irradiated with a CuKα X-ray over an irradiation area of at least 25 mm$^2$ per mg of the carbonaceous material, the ratio R (=Ia/Ib) is about 0.35 to 5, preferably about 0.5 to 4, more preferably about 1 to 3, wherein Ia is the integrated intensity of the peak having the strongest integrated intensity among the peaks appearing in the range of 40°<2θ<50° assigned to iron or iron carbide contained in the carbon tubes, and Ib is the integrated intensity of the peak appearing in the range of 26°<2θ<27° assigned to the mean spacing between the hexagonal carbon layers (d002) of the carbon tubes.

In this Specification, the above ratio of Ia/Ib is called the R value. Since the peak intensity is observed as an average value among the carbonaceous material as a whole when the carbonaceous material comprising iron-carbon composites of the present invention is observed by X-ray diffraction over an X-ray irradiation area of at least 25 mm², this R value does not represent a content or filling proportion of iron carbide or iron in one single iron-carbon composite that can be measured by TEM analysis, but represents an average value of the iron carbide or iron content or filling proportion for the carbonaceous material as a whole, which comprises a group of iron-carbon composites.

Furthermore, the average filling proportion for the entire carbonaceous material containing numerous iron-carbon composites of the present invention can also be determined by observing various fields by TEM, measuring the average iron carbide- or iron-filling proportion in various iron-carbon composites observed in each field, and calculating the average value of the average filling proportions in said various fields. With this measurement process, the average iron carbide- or iron-filling proportion for the entire carbonaceous material comprising iron-carbon composites of the present invention is about 10 to 90%, and particularly about 40 to 70%.

Process for Preparing the Iron-carbon Composites of the Present Invention and a Carbonaceous Material Containing the Composites (First Preparation Process)

The carbonaceous material comprising iron-carbon composites of the present invention is obtained by a preparation process comprising the steps of:

(1) adjusting the pressure to $10^{-5}$ Pa to 200 kPa in an inert gas atmosphere, adjusting the oxygen concentration in a reaction furnace such that the ratio B/A is $1 \times 10^{-10}$ to $1 \times 10^{-1}$ when the reaction furnace volume is A (liters) and the oxygen quantity is B (Ncc), and heating an iron halide to a temperature between 600° C. and 900° C. in the reaction furnace; and (2) introducing an inert gas and, at a pressure of between $10^{-5}$ Pa and 200 kPa, introducing a pyrolyzable carbon source and performing a heat treatment at a temperature between 600 and 900° C.

The term "Ncc" herein, which is the unit of the oxygen quantity B, means the volume (cc) converted to a standard state at 25° C.

Examples of the iron halide, which is the source of the contained iron carbide or iron and which also acts as a catalyst, include iron fluoride, iron chloride, iron bromide and the like, among which iron chloride is preferred. Examples of iron chlorides include $FeCl_2$, $FeCl_3$, $FeCl_2.4H_2O$, and $FeCl_3.6H_2O$, and at least one of them may be used. There are no particular restrictions on the form of this catalyst, but it is usually preferable to use the catalyst in the form of a powder, such as a powder having an average particle diameter of about 1 to 100 μm, particularly about 1 to 20 μm, or in the form of a gas.

As the pyrolyzable carbon source, various organic compounds can be used. Examples include organic compounds such as benzene, toluene, xylene and like $C_6$ to $C_{12}$ aromatic hydrocarbons; methane, ethane, propane, butane, hexane and like $C_1$ to $C_{10}$ saturated aliphatic hydrocarbons; ethylene, propylene, acetylene and like $C_2$ to $C_5$ unsaturated aliphatic hydrocarbons. Liquid organic compounds are usually used after being vaporized. Of these, benzene, toluene and so on are preferred.

Examples of the reaction apparatus used in the present invention include the apparatus shown in FIG. 1. With the apparatus shown in FIG. 1, a reaction furnace 1 comprises a quartz tube, alumina tube, carbon tube or the like, and is equipped with a heating apparatus 2. This reaction furnace has a gas introduction port (not shown) and a gas suction port (not shown) for lowering the pressure to a vacuum. The iron halide is disposed in the reaction furnace, for example, as spread in the form of a thin layer inside a porcelain boat, nickel boat or like iron halide supply tray 5.

Step (1)

In the preparation process of the present invention, the iron halide acting as the above-mentioned catalyst is heated to a temperature between 600° C. and 900° C. in the reaction furnace in an inert gas atmosphere.

Examples of inert gases include He, Ar, Ne, $N_2$ and the like. It is preferable that the pressure inside the reaction furnace during the heat treatment of the catalyst in the inert gas atmosphere is, for example, about $10^{-5}$ Pa to 200 kPa, particularly about 0.1 kPa to 100 kPa.

The heat treatment is performed until the temperature inside the reaction furnace, and particularly the temperature of the catalyst, reaches the pyrolysis temperature of the pyrolyzable carbon source to be used in step (2). The pyrolysis temperature of the pyrolyzable carbon source varies with the type of pyrolyzable carbon source to be used. Generally, it is preferable that the temperature of the catalyst in the reaction furnace is adjusted to about 600 to 900° C., particularly about 750 to 900° C.

Research by the inventors has revealed that it is preferable that a small amount of oxygen is present during the heating stage in step (1). If a large quantity of oxygen is present, the iron halide turns into iron oxide, making it difficult to obtain the desired composite. Therefore, it is preferable that the oxygen concentration inside the reaction furnace is such that the ratio B/A is between $1 \times 10^{-10}$ and $1 \times 10^{-1}$, particularly $1 \times 10^{-8}$ to $5 \times 10^{-3}$, wherein A is the reaction furnace volume (liters) and B is the amount of oxygen (Ncc).

A variety of methods can be employed to introduce the oxygen, but one preferred example is to gradually add a mixed gas composed of an inert gas such as argon containing about 5 to 0.01% oxygen through the gas introduction port of the reaction furnace.

Step (2)

Next, in step (2) of the present invention, an inert gas is introduced into the reaction furnace containing the iron halide that has been heated to between 600 and 900° C. by the heat treatment in step (1), and a pyrolyzable carbon source is introduced through the gas introduction port to perform a heat treatment.

The pressure during the heat treatment of step (2) is preferably about $10^{-5}$ Pa to 200 kPa, and particularly about 1 kPa to 100 kPa. The temperature during the heat treatment of step (2) is usually at least 600° C., and particularly 600 to 900° C., and preferably about 750 to 900° C.

The pyrolyzable carbon source is introduced, for example, by a method comprising bubbling an inert gas, such as argon, into a pyrolyzable carbon source, such as benzene, to thereby provide an inert gas carrying the pyrolyzable carbon source, such as benzene, and introducing the gas in small portions through the gas introduction port of the reaction furnace. This is not the only method that can be used, though, and other methods may be employed instead. The rate at which the inert gas carrying a pyrolyzable carbon source such as benzene is supplied can be selected from a wide range, but generally the rate is preferably about 0.1 to 1000 ml/min, and particularly about 1 to 100 ml/min, per liter of the reaction furnace volume. If desired, an inert gas, such as Ar, Ne, He or nitrogen, may be introduced as a diluting gas.

The amounts of the iron halide and the pyrolyzable carbon source may be suitably selected from a wide range, but it is preferable to use the pyrolyzable carbon source in an amount of about 10 to 5000 weight parts, and particularly about 50 to 300 weight parts, per 100 weight parts of iron halide. When the proportion of organic compound (pyrolyzable carbon source) increases, the growth of the carbon tubes proceeds sufficiently, yielding carbon tubes of longer length.

There are no particular restrictions on the reaction time in step (2), which will vary with the types and amounts of raw materials and other factors, but the reaction time is usually about 0.1 to 10 hours, and particularly about 0.5 to 2 hours.

After the heat treatment in step (2), the product is cooled to 500° C. usually at a rate of about 50 to 2000° C./h, preferably about 70 to 1500° C./h, and more preferably about 100 to 1000° C./h, yielding iron-carbon composites composed of nanoflake carbon tubes and iron carbide or iron filling 10 to 90% of the internal spaces of these tubes.

Also, after the heat treatment in step (2), iron-carbon composites composed of nested multi-walled carbon nanotubes and iron carbide or iron filling 10 to 90% of the internal spaces of the tubes can be produced by carrying out the steps of:

(3) replacing the atmosphere inside the reaction furnace with an inert gas while the temperature in step (2) is maintained;

(4) elevating the temperature in the reaction furnace, the atmosphere of which has been replaced with the inert gas, to 950 to 1500° C., preferably 1200 to 1500° C., and more preferably 1300 to 1400° C.;

(5) maintaining the final temperature at the end of the temperature elevation until nested multi-walled carbon nanotubes are produced; and (6) cooling the reaction furnace at a rate of 50° C./h or lower, preferably about 5 to 40° C./h, and more preferably about 10 to 30° C./h.

Examples of the inert gas used in step (3) above include Ar, Ne, He, nitrogen and like inert gas. There are no particular restrictions on the pressure inside the furnace after the replacement in step (3), but this pressure is generally about $10^{-5}$ to $10^7$ Pa, preferably about 50 to $2 \times 10^5$ Pa, and more preferably about 100 to $1.2 \times 10^5$ Pa.

There are no particular restrictions on the temperature elevation rate in step (4), but it is generally preferable to use a temperature elevation rate of about 50 to 2000° C./h, particularly about 70 to 1500° C./h, and more preferably about 100 to 1000° C./h.

The final temperature is maintained in step (5) until the nested multi-walled carbon nanotubes are produced. Generally, about 2 to 30 hours is necessary.

The atmosphere in which the cooling in step (6) is carried out is an Ar, Ne, He, nitrogen or like inert gas atmosphere. While there are no particular restrictions on the pressure conditions, the pressure is generally about $10^{-5}$ to $10^7$ Pa, preferably about 50 to $2 \times 10^5$ Pa, and more preferably about 100 to $1.2 \times 10^5$ Pa.

High-yield Process (Second Preparation Process)

According to another embodiment of the present invention, the yield of the iron-carbon composite of the present invention can be further increased by supplying an organic iron complex along with the pyrolyzable carbon source in step (2) in the first preparation process described above. The preparation process in this embodiment is called the "second preparation process" in this Specification.

Examples of organic iron complexes include ferrocene, $Fe(CO)_5$ and like iron carbonyl complexes, among which ferrocene is preferred.

A variety of methods can be employed to place an organic iron complex such as ferrocene in the reaction system. A typical method that can be employed is shown in FIG. 2.

Figure 2:
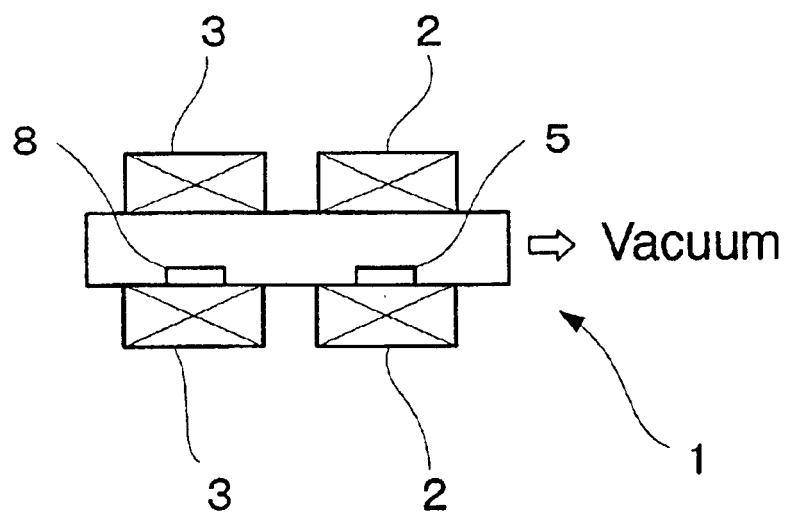
FIG. 2 is a schematic diagram illustrating another example of the production apparatus used to carry out the production process of the present invention.

First, as shown in FIG. 2, in a reaction furnace equipped with a gas introduction port (not shown) and a gas suction port (not shown), a porcelain boat or like supply tray 8 containing an organic iron complex is disposed on the upstream side (that is, near the gas introduction port), and a porcelain boat or like supply tray 5 containing an iron halide is disposed on the downstream side (that is, far from the gas introduction port).

Next, in step (1), the iron halide is heated with a heating apparatus 2 to a temperature between 600 and 900° C. with the pressure adjusted to $10^{-5}$ Pa to 200 kPa in an inert gas atmosphere, and with the oxygen concentration in the reaction furnace adjusted such that the ratio B/A is between $1 \times 10^{-10}$ and $1 \times 10^{-1}$, particularly $1 \times 10^{-8}$ to $5 \times 10^{-3}$, wherein A is the reaction furnace volume (liters) and B is the amount of oxygen (Ncc).

In step (2), an inert gas is introduced, and the pressure is controlled to $10^{-5}$ Pa to 200 kPa, preferably 1 Pa to 100 kPa. On the other hand, the organic iron complex is heated to its sublimation temperature (200° C. in the case of ferrocene) with a separate heating apparatus 3 to convert the organic iron complex, such as ferrocene, to its vapor phase state, and a mixed gas composed of a pyrolyzable carbon source and an inert gas is introduced into the reaction furnace. If desired, an inert gas, such as Ar, Ne, He or nitrogen, may be introduced as a diluting gas. As a result, a pyrolyzable carbon source, ferrocene, and an iron halide are present in the reaction furnace. This system is then heat treated. The conditions of this heat treatment are basically the same as those described with respect to step (2) in the first preparation process described above.

Specifically, the pressure during this heat treatment is preferably adjusted to about $10^{-5}$ Pa to 200 kPa, and particularly about 1 kPa to 100 kPa. The temperature during the above-mentioned heat treatment is usually at least 600° C., particularly 600 to 900° C., and preferably about 750 to 900° C. The rate at which the inert gas carrying a pyrolyzable carbon source, such as benzene, is supplied can be selected from a wide range, but generally is about 0.1 to 1000 ml/min, and particularly about 1 to 100 ml/min, per liter of reaction furnace volume. The duration of the above-mentioned heat treatment varies with the types and amounts of raw materials and other factors, and is not particularly limited, but usually ranges from about 0.1 hour to 10 hours, and particularly from about 0.5 hour to 2 hours.

The proportions of the organic iron complex, iron halide, and pyrolyzable carbon source above may be selected from a wide range, but it is generally preferable for the quantities to be as follows.

The organic iron complex is advantageously used in an amount of about 1 to 5000 weight parts, and preferably about 10 to 1000 weight parts, per 100 weight parts of the iron halide.

The pyrolyzable carbon source is preferably used in an amount of about 10 to 5000 weight parts, and particularly about 50 to 300 weight parts, per 100 weight parts of the iron halide.

This second preparation process increases the yield of the carbonaceous material containing the resulting iron-carbon composite.

Just as with the first preparation process given above, iron-carbon composites composed of nanoflake carbon tubes and iron carbide or iron filling 10 to 90% of the internal spaces of the tubes are obtained, by cooling, after the heat treatment in step (2), the product to 500° C. at a rate of about 50 to 2000° C./h, preferably about 70 to 1500° C./h, more preferably about 100 to 1000° C./h.

Also, after the heat treatment in step (2), iron-carbon composites composed of nested multi-walled carbon nanotubes and iron carbide or iron filling 10 to 90% of the internal spaces of the tubes can be produced by carrying out the steps of:

(3) replacing the atmosphere inside the reaction furnace with an inert gas while the temperature in step (2) is maintained;

(4) elevating the temperature in the reaction furnace, the atmosphere of which has been replaced with the inert gas, to 950 to 1500° C., preferably 1200 to 1500° C., and more preferably 1300 to 1400° C.;

(5) maintaining the final temperature at the end of the temperature elevation until nested multi-walled carbon nanotubes are produced; and (6) cooling the reaction furnace at a rate of 50° C./h or lower, preferably about 5 to 40° C./h, and more preferably about 10 to 30° C./h.

Examples of the inert gas used in step (3) above include Ar, Ne, He, nitrogen and like inert gas. There are no particular restrictions on the pressure inside the furnace after the replacement in step (3), but this pressure is generally about $10^{-5}$ to $10^7$ Pa, preferably about 50 to $2\times10^5$ Pa, and more preferably about 100 to $1.2\times10^5$ Pa.

There are no particular restrictions on the temperature elevation rate in step (4), but it is generally preferable to use a temperature elevation rate of about 50 to 2000° C./h, particularly about 70 to 1500° C./h, and more preferably about 100 to 1000° C./h.

The final temperature is maintained in step (5) until the nested multi-walled carbon nanotubes are produced. Generally, about 2 to 30 hours is necessary.

The atmosphere in which the cooling in step (6) is carried out is an Ar, Ne, He, nitrogen or like inert gas atmosphere. While there are no particular restrictions on the pressure conditions, the pressure is generally about $10^{-5}$ to $10^7$ Pa, preferably about 50 to $2\times10^5$ Pa, and more preferably about 100 to $1.2\times10^5$ Pa.

The iron-carbon composites that make up the carbonaceous material obtained by the above first or second preparation process can also be isolated from said material.

The iron-carbon composites obtained by the above first or second preparation process have the following distinctive properties.

Carbon tubes selected from the group consisting of nanoflake carbon tubes and nested multi-walled carbon nanotubes, which make up the walls, have greater straightness than known CNTs. This greater straightness affords higher bulk density and allows more carbon tubes to fit into a given volume, so that packing at a higher density is possible. Increased straightness is also advantageous in electron emission applications.

10 to 90% of the internal spaces surrounded by the tube walls is filled with iron carbide or iron. As will be clear from the Examples, the iron carbide or iron present inside these spaces is in a highly crystalline state. Therefore, the contained substance exhibits magnetism, and the surface thereof is covered with carbon, so that novel molecular magnets with excellent durability are obtained.

It is known that the electrical or magnetic characteristics of carbon nanotubes that do not contain a metal are highly dependent on the structure of the walls, and for uniformly obtaining the desired electrical or magnetic characteristics, the wall structure must be precisely controlled. For instance, with respect to hollow, single-walled carbon nanotubes that do not contain anything, it is theoretically known that the electroconductivity thereof varies depending on whether the graphene sheets are wound in an armchair, zigzag or chiral form, resulting in a conductor or a semiconductor. However, it is extremely difficult to precisely control the wall structure using currently available synthesis technologies.

On the other hand, the carbonaceous material of the present invention, in which 10 to 90% of the spaces of carbon tubes selected from the group consisting of the nanoflake carbon tubes and nested multi-walled carbon nanotubes of the present invention are filled with iron carbide or iron, exhibits electrical or magnetic characteristics mainly due to the contained metal, rather than due to the carbon wall structure, and therefore is advantageous in that precise control of the wall structure is not necessary and production is easy. Particularly in the case of nanoflake carbon tubes, the wall maintains its graphitic properties and acts as an excellent protective film for preventing the contained metal from being deformed or denatured when the carbonaceous material is used for electron emission purposes, so the electrical characteristics are more dependent on the contained metal, and it is easier to control these characteristics.

The iron-carbon composites of the present invention, which contain iron carbide or iron and have a highly straight shape, provide excellent electron emission performance, have good orientation property under magnetic field and serve as a material suitable for FED (Field Emission Display) applications.

Also, when the iron-carbon composites of the present invention are used by incorporating them as a conduction auxiliary into a resin or the like, an increase in electrical conductivity is observed even by adding them in a small amount, so that the original transparency, hue and so forth of the resin are not impaired in the molded resin articles.

Another advantage is that the addition of the iron-carbon composites of the present invention to a resin increases the strength of the molded resin articles.

Furthermore, if part of the wall of the iron-carbon composite of the present invention is opened by a chemical treatment, the metal or the like contained in the composite can be gradually released.

EXAMPLES

Examples will be given below to describe the features of the present invention in further detail.

Example 1

The iron-carbon composite of the present invention was obtained as follows by using a reaction apparatus as shown in FIG. 1.

Step (1)

Anhydrous $FeCl_3$ (0.5 g, made by Kanto Kagaku) was spread in a thin layer inside a porcelain boat. This boat was then placed in the center of a furnace made of a quartz tube, and the pressure inside the furnace was lowered to 50 Pa. At this point, argon gas containing 5,000 ppm oxygen was supplied at a rate of 30 ml/min from the end of the reaction furnace (from the left side of the reaction tube in FIG. 1) opposite to the end to which a vacuum line was attached. As a result, the ratio B/A was set to $2.5 \times 10^{-3}$, wherein A is the reaction furnace volume (liters) and B is the amount of oxygen (Ncc). The temperature was then raised to a reaction temperature of 800° C. while maintaining the reduced pressure.

Step (2)

When the temperature reached 800° C., argon was introduced, and the pressure was adjusted to $6.7 \times 10^4$ Pa. Meanwhile, argon gas was bubbled into a tank of benzene used as a pyrolyzable carbon source, and the volatilized gas mixture of benzene and argon was introduced into the reaction furnace at a rate of 30 ml/min per liter of the reaction furnace volume. Argon gas was introduced as a diluting gas at a rate of 20 ml/min.

The reaction was continued for 30 minutes at a temperature of 800° C., and the temperature was lowered to 500° C. over 20 minutes, and then the heater was removed and the reaction furnace was air-cooled to room temperature over 20 minutes, whereby 200 mg of a carbonaceous material comprising the iron-carbon composites of the present invention was obtained.

SEM observation revealed that the obtained iron-carbon composites had outside diameters of 15 to 40 nm, lengths of 2 to 3 microns, and had highly straight shapes. The thicknesses of the walls composed of carbon were 2 to 10 nm, and were substantially uniform over the entire lengths. Also, it was confirmed by TEM observation and X-ray diffraction that the walls were nanoflake carbon tubes having a graphitic structure in which the mean spacing between the hexagonal carbon layers (d002) was 0.34 nm or less.

It was also confirmed by X-ray diffraction and EDX that the above-mentioned iron-carbon composites of the present invention contained iron carbide.

Electron microscopic (TEM) observation of the numerous iron-carbon composites which made up the obtained carbonaceous material of the present invention revealed the presence of various iron-carbon composites in which the filling proportion of the iron carbide present in the internal spaces of the nanoflake carbon tubes (that is, the spaces defined by the walls of the nanoflake carbon tubes) varied between 10% and 80%.

Incidentally, the average filling proportion of the iron carbide present in the internal spaces of the nanoflake carbon tubes of the numerous iron-carbon composites was 40%. Table 1 below shows the average filling proportion of iron carbide, determined by observing a plurality of fields of TEM images of the obtained iron-carbon composites. The R value calculated by X-ray diffraction was 0.56.

TABLE 1

| | Iron carbide filling proportion (%) |
|---|---|
| Field 1 | 45 |
| Field 2 | 40 |
| Field 3 | 35 |
| Field 4 | 35 |
| Field 5 | 45 |
| Average | 40 |

FIG. 3 shows an electron microscope (TEM) photograph of one of the iron-carbon composites which made up the carbonaceous material obtained in Example 1.

FIG. 4 shows an electron microscope (TEM) photograph of how the numerous iron-carbon composites are present in the carbonaceous material obtained in Example 1.

Figure 5:
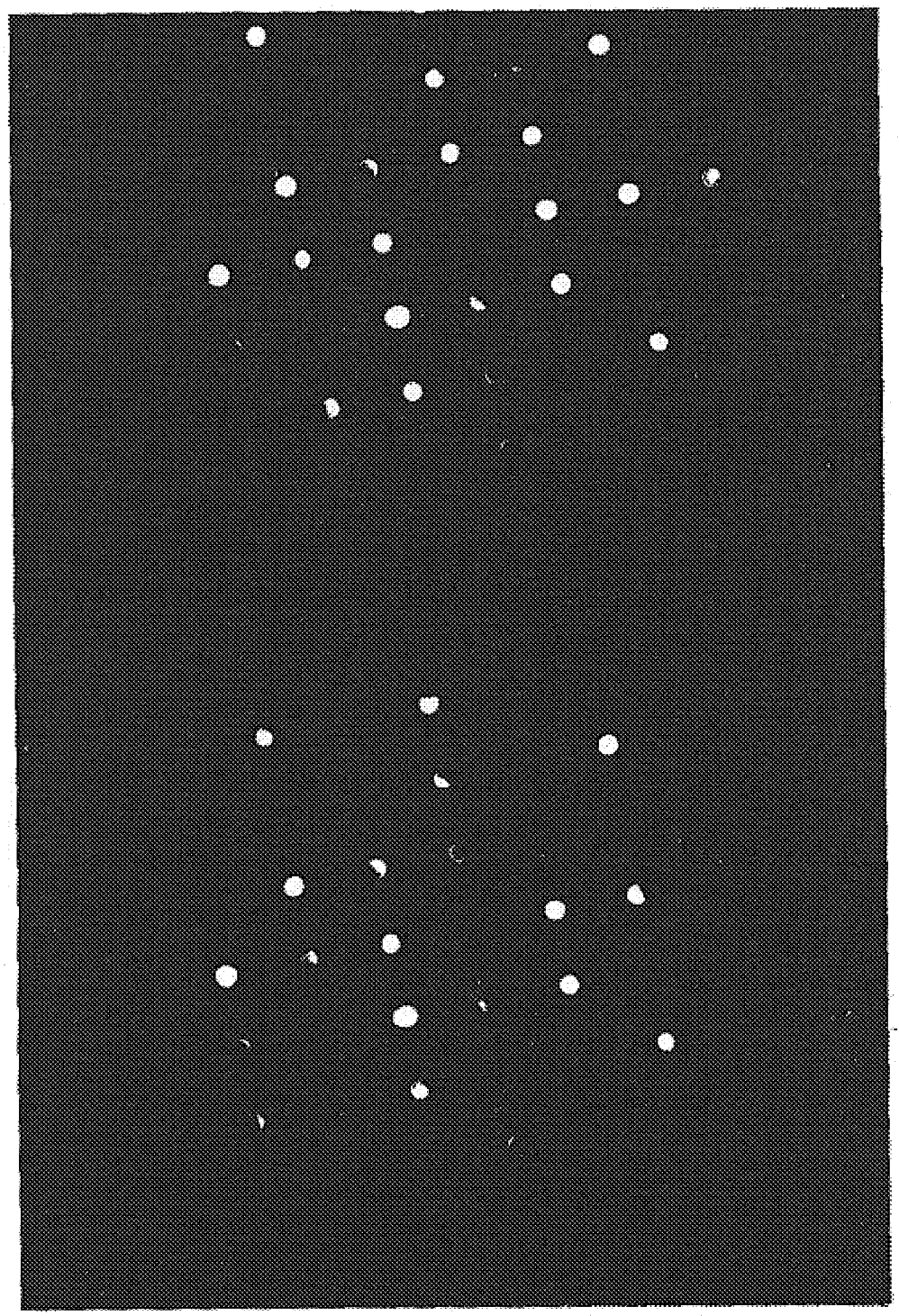
FIG. 5 is an electron beam diffraction pattern of one of the iron-carbon composites obtained in Example 1.

FIG. 5 shows an electron beam diffraction pattern of one of the iron-carbon composites obtained in Example 1. As seen from FIG. 5, a sharp electron diffraction pattern is observed, and therefore the contained material is highly crystalline. TEM observation revealed that the crystallinity ratio of the contained substance (the ratio of the area of a TEM image of the crystalline iron carbide to the area of a TEM image of the region filled with the iron carbide) was approximately 100%.

Figure 6:
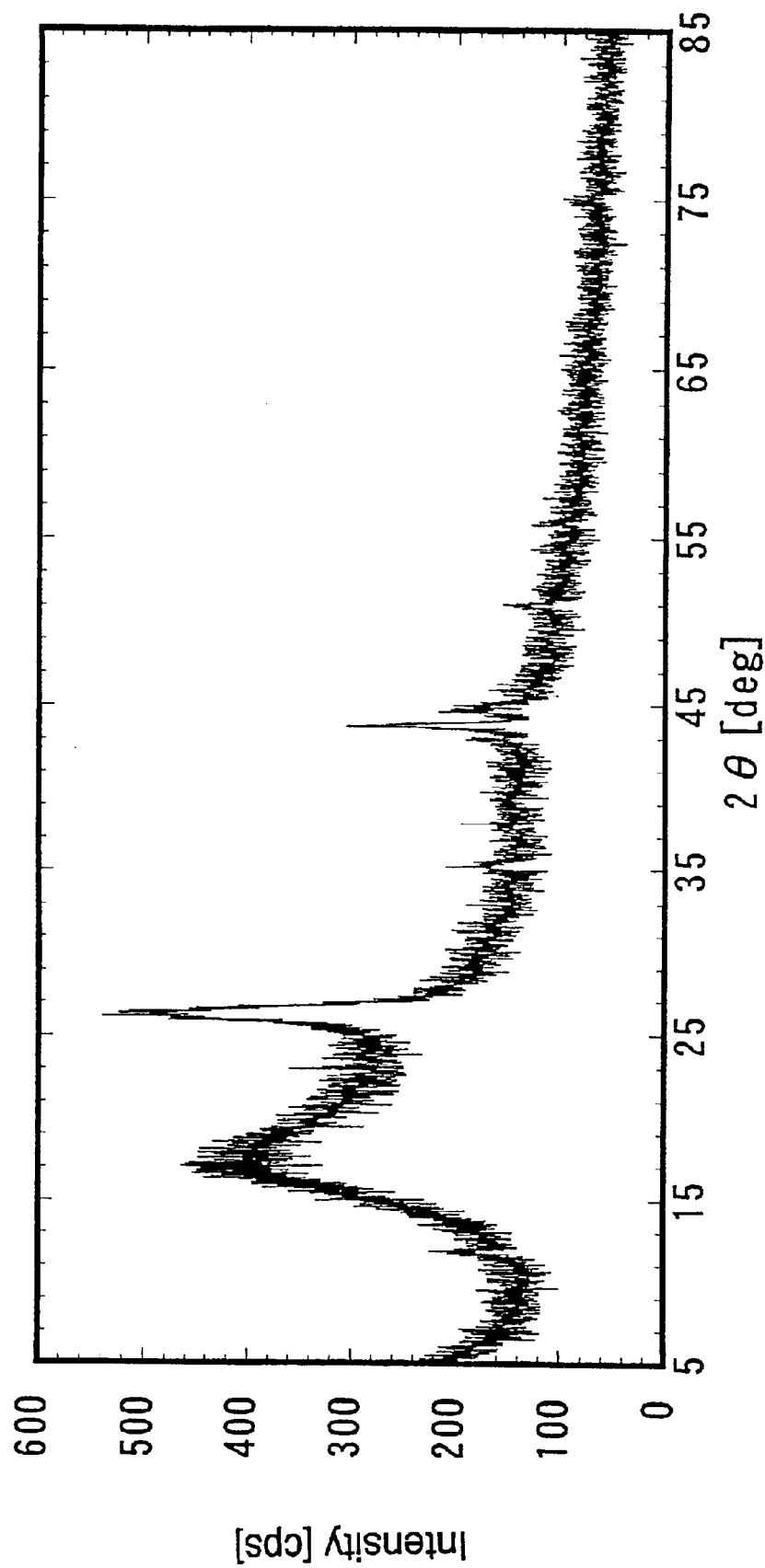
FIG. 6 is an X-ray diffraction pattern of the carbonaceous material comprising the iron-carbon composites obtained in Example 1 (group of iron-carbon composites).

FIG. 6 shows an X-ray diffraction pattern of a carbonaceous material comprising the iron-carbon composites obtained in Example 1 (group of iron-carbon composites).

FIG. 7 shows a transmission electron microscope (TEM) photograph of a single iron-carbon composite obtained in Example 1 and cut crosswise.

As can be seen from FIG. 7, in the carbonaceous material obtained in Example 1, the carbon walls thereof were nanoflake carbon tubes that look like a patchwork (or papier-mâché) form rather than a nested or scrolled structure.

FIG. 7 also shows that the nanoflake carbon tubes that make up the iron-carbon composites obtained in this example have a cylindrical shape, and the graphene sheet images observed in the TEM photograph of a cross section perpendicular to the lengthwise direction thereof are not in the form of closed rings, but non-continuous rings having many non-continuous points.

Also, when the nanoflake carbon tubes that made up the iron-carbon composites of the present invention were observed by TEM, with respect to the numerous substantially linear graphene sheet images oriented in the lengthwise direction, the length of each graphene sheet image was roughly in the range of 2 to 30 nm (FIG. 3).

EDX measurement at points 1 to 20 inside the tube in FIG. 7 revealed that a substantially uniform compound having a carbon:iron atomic ratio of 5:5 was contained.

Example 2

The iron-carbon composite of the present invention was obtained as follows by using a reaction apparatus as shown in FIG. 1.

Step (1)

0.5 g of $FeCl_2 \cdot 4H_2O$ (made by Kanto Kagaku) was spread in a thin layer inside a porcelain boat. This boat was then placed in the center of a furnace made of a quartz tube, and the pressure inside the furnace was lowered to 50 Pa. Argon gas containing 5,000 ppm oxygen was supplied at this point at a rate of 5 ml/min from the end of the reaction furnace (the left side of the reaction tube in FIG. 1) opposite to the end to which a vacuum line was attached. As a result, the ratio B/A was set to $2.5 \times 10^{-3}$, wherein A is the reaction furnace volume (liters) and B is the amount of oxygen (Ncc). The temperature was then raised to a reaction temperature of 800° C. while the reduced pressure was maintained.

Step (2)

When the temperature reached 800° C., argon was introduced and the pressure was adjusted to $6.7 \times 10^4$ Pa. Meanwhile, argon gas was bubbled into a tank of benzene used as a pyrolyzable carbon source, and the volatilized mixed gas of benzene and argon was introduced into the reaction furnace at a rate of 30 ml/min per liter of the reaction furnace volume. Argon gas was also introduced as a diluting gas at a rate of 20 ml/min.

The reaction was continued for 30 minutes at a temperature of 800° C., and the temperature was lowered to 500° C. over 20 minutes, and then the heater was removed and the system was air-cooled to room temperature over 20 minutes, whereby 120 mg of a carbonaceous material comprising the iron-carbon composites of the present invention was obtained.

SEM observation revealed that the iron-carbon composites which made up the carbonaceous material had outside diameters of 15 to 40 nm and lengths of 2 to 3 microns, and had highly straight shapes. The thicknesses of the walls composed of carbon ranged from 2 nm to 10 nm, and were substantially uniform over the entire lengths. Also, it was confirmed by TEM observation and X-ray diffraction that the walls were nanoflake carbon tubes having a graphitic structure in which the mean spacing between the hexagonal carbon layers (d002) was 0.34 nm or less.

Figure 8:
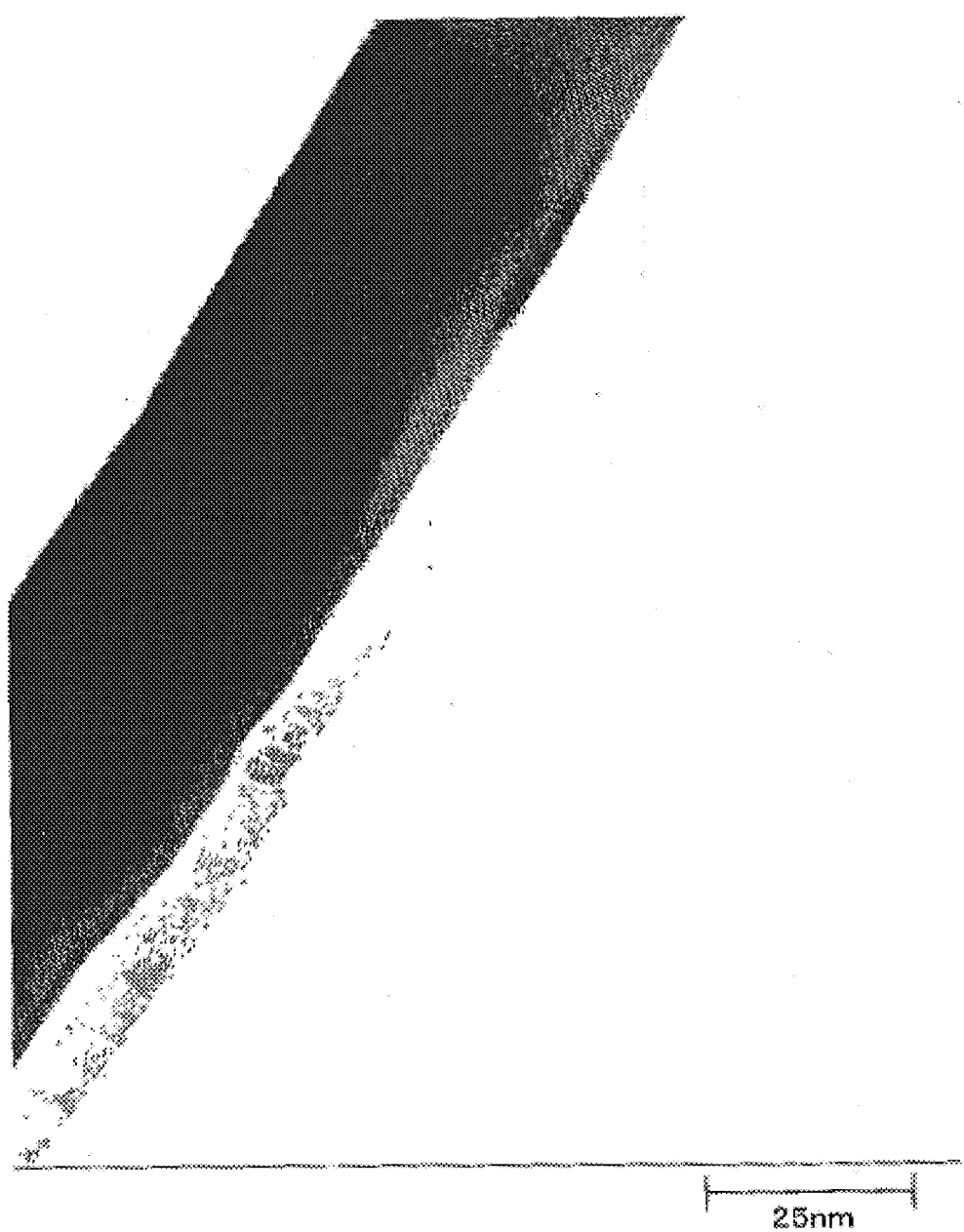
FIG. 8 is a transmission electron microscope (TEM) photograph of one of the iron-carbon composites that make up the carbonaceous material obtained in Example 2.

FIG. 8 shows a transmission electron microscope (TEM) photograph of one of the iron-carbon composites obtained in Example 2.

Figure 9:
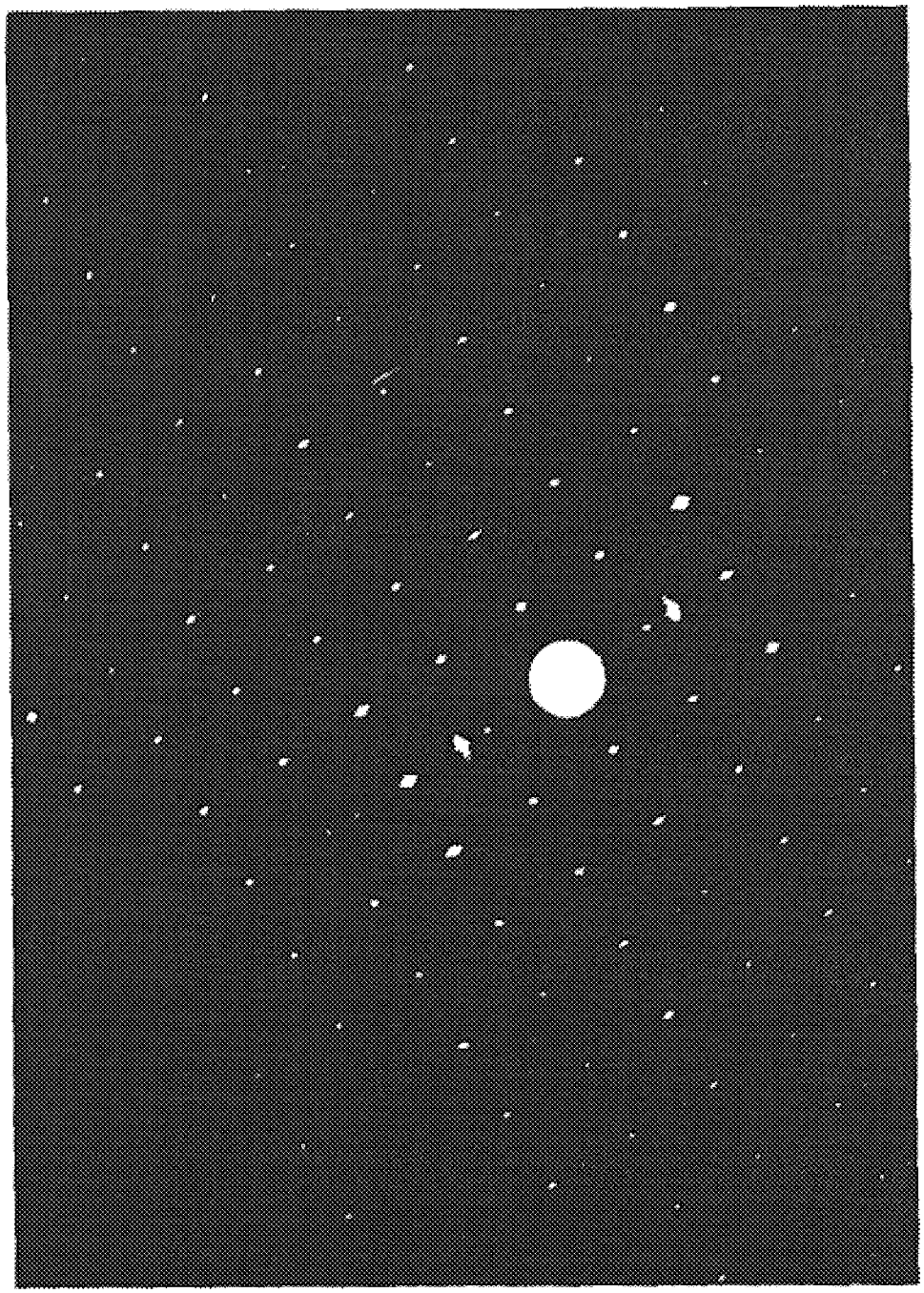
FIG. 9 is an electron beam diffraction pattern of the iron-carbon composite obtained in Example 2.

FIG. 9 shows an electron beam diffraction pattern of the iron-carbon composite obtained in Example 2. As seen from FIG. 9, a sharp electron diffraction pattern is observed, and therefore the contained material is highly crystalline. TEM observation revealed that the crystallinity ratio of the contained material (the ratio of the area of a TEM image of the crystalline iron carbide to the area of a TEM image of the region filled with the iron carbide or iron) was approximately 100%.

Electron microscopic (TEM) observation of the numerous iron-carbon composites that made up the obtained carbonaceous material of the present invention revealed the presence of various iron-carbon composites in which the filling proportion of the iron carbide present in the internal spaces of the nanoflake carbon tubes (that is, the spaces defined by the walls of the nanoflake carbon tubes) varied between 10% and 80%.

TEM observation revealed that in the carbonaceous material comprising the iron-carbon composites of the present invention, the average filling proportion of the iron carbide or iron present in the internal spaces of the nanoflake carbon tubes was 30% (an average value for the carbonaceous material). The R value calculated based on X-ray diffraction in the same manner as in Example 1 was 0.42.

The nanoflake carbon tubes that made up the iron-carbon composites obtained in this example had a cylindrical shape, and the graphene sheet images observed in a TEM photograph of a cross section perpendicular to the lengthwise direction thereof were not in the form of closed rings, but in the form of non-continuous rings having many non-continuous points.

Also, when the nanoflake carbon tubes that made up the iron-carbon composites of the present invention were observed by TEM, the numerous substantially linear graphene sheet images were oriented in the lengthwise direction and the length of each graphene sheet image was roughly 2 to 30 nm (FIG. 8).

Example 3

The iron-carbon composite of the present invention was obtained by performing the following steps (1) and (2) using a reaction apparatus as shown in FIG. 2.

Step (1)

0.5 g of anhydrous $FeCl_3$ (made by Kanto Kagaku) was spread in a thin layer inside a porcelain boat. This boat was then placed on the downstream side in a furnace made of quartz tube. Ferrocene placed in a porcelain boat was placed on the upstream side in the furnace.

The pressure inside the furnace was lowered to 50 Pa. At this point, argon gas containing 5,000 ppm oxygen was supplied at a rate of 30 ml/min from the end of the reaction furnace opposite to the vacuum line. As a result, the ratio B/A was set to $2.5 \times 10^{-3}$, wherein A is the reaction furnace volume (liters) and B is the amount of oxygen (Ncc). The temperature was then raised to a reaction temperature of 800° C. while the reduced pressure was maintained.

Step (2)

When the temperature reached 800° C., argon was introduced and the pressure was adjusted to $6.7 \times 10^4$ Pa. Meanwhile, the ferrocene in the porcelain boat disposed on the upstream side in the furnace was heated to 200° C. while the pressure was held at $6.7 \times 10^4$ Pa.

Argon gas was bubbled into a tank of benzene used as a pyrolyzable carbon source, and the volatilized mixed gas of benzene and argon was introduced into the reaction furnace at a rate of 30 ml/min per liter of the reaction furnace volume. Argon gas was also introduced as a diluting gas at a rate of 20 ml/min. The reaction was continued for 30 minutes at a temperature of 800° C.

After the temperature was lowered to 500° C. over 20 minutes, the heater was removed and the system was air-cooled to room temperature over 20 minutes, whereby 240 mg of a carbonaceous material comprising iron-carbon composites was obtained in the reaction tube.

SEM observation revealed that the obtained iron-carbon composites had outside diameters of 15 to 40 nm and lengths of 2 to 3 microns, and had highly straight shapes.

The thicknesses of the walls composed of carbon were 5 to 15 nm, and were substantially uniform over the entire lengths. Also, it was confirmed by TEM observation and X-ray diffraction that the walls were multi-walled nanoflake carbon tubes having a graphitic structure in which the mean spacing between the hexagonal carbon layers (d002) was 0.34 nm or less.

Electron microscopic (TEM) observation of the numerous iron-carbon composites that made up the carbonaceous material of the present invention revealed the presence of various iron-carbon composites in which the filling proportion of the iron carbide or iron present in the internal spaces of the nanoflake carbon tubes (that is, the spaces defined by the walls of the nanoflake carbon tubes) varied between 25% and 90%.

A sharp electron diffraction pattern was observed with respect to the contained material, and therefore the contained material was highly crystalline. TEM observation revealed that the crystallinity ratio of the contained material (the ratio of the area of a TEM image of the crystalline iron carbide to the area of a TEM image of the region filled with the iron carbide or iron) was approximately 100%.

TEM observation revealed that the average filling proportion of the iron carbide or iron present in the internal spaces of the nanoflake carbon tubes of the numerous iron-carbon composites was 60% (an average value for the carbonaceous material). The R value calculated based on X-ray diffraction in the same manner as in Example 1 was 1.23.

The nanoflake carbon tubes that made up the iron-carbon composites obtained in this example had a cylindrical shape, and the graphene sheet images observed in a TEM photograph of a cross section perpendicular to the lengthwise direction thereof were not in the form of closed rings, but in the form of non-continuous rings having many non-continuous points.

Also, when the nanoflake carbon tubes that made up the iron-carbon composites of the present invention were observed by TEM, numerous substantially straight graphene sheet images were oriented in the lengthwise direction, and the length of each graphene sheet images was roughly in the range of 2 to 30 nm.

Example 4

The iron-carbon composite of the present invention was obtained as follows by using a reaction apparatus as shown in FIG. 1, in which the reaction tube was made of carbon to improve heat resistance.

Step (1)

0.5 g of anhydrous $FeCl_3$ (made by Kanto Kagaku) was spread in a thin layer inside a porcelain boat. This boat was then placed in the center of a furnace composed of a reaction tube made of carbon, and the pressure inside the furnace was lowered to 50 Pa. At this point, argon gas containing 5000 ppm oxygen was supplied at a rate of 5 ml/min from the end of the reaction furnace opposite to the vacuum line. As a result, the ratio B/A was set to $2.5 \times 10^{-3}$, wherein A is the reaction furnace volume (liters) and B is the amount of oxygen (Ncc). The temperature was then raised to a reaction temperature of 800° C. while the reduced pressure was maintained.

Step (2)

When the temperature reached 800° C., argon was introduced and the pressure was adjusted to $6.7 \times 10^4$ Pa. Meanwhile, argon gas was bubbled into a tank of benzene used as a pyrolyzable carbon source, and the volatilized mixed gas of benzene and argon was introduced into the reaction furnace at a rate of 30 ml/min per liter of the reaction furnace volume. Argon gas was also introduced as a diluting gas at a rate of 20 ml/min.

The reaction was continued for 120 minutes at a temperature of 800° C., and then the pressure was lowered to 50 Pa while maintaining the temperature of 800° C. The pressure was then adjusted to $9.0 \times 10^4$ Pa in an argon atmosphere, and the temperature inside the furnace was raised to 1350° C. over 120 minutes, and maintained at 1350° C. for 6 hours. Then the furnace was cooled to 500° C. over 24 hours, and the heater was removed and the furnace was allowed to cool to room temperature, whereby 220 mg of a carbonaceous material comprising the iron-carbon composites of the present invention was obtained.

SEM observation revealed that the iron-carbon composites that made up the obtained carbonaceous material had diameters of 15 to 40 nm and lengths of 2 to 5 microns, and had highly straight shapes. The thicknesses of the walls composed of carbon were in the range of 2 to 10 nm, and were substantially uniform over the entire lengths. Also, it was confirmed by TEM observation and X-ray diffraction that the walls were nested multi-walled carbon nanotubes having a graphitic structure in which the mean spacing between the hexagonal carbon layers (d002) was 0.34 nm or less.

Electron microscopic (TEM) observation of the numerous iron-carbon composites which made up the carbonaceous material of the present invention revealed the presence of various iron-carbon composites in which the filling proportion of the iron carbide or iron present in the internal spaces of the nested multi-walled carbon nanotubes (that is, the spaces defined by the walls of the nested multi-walled carbon nanotubes) varied between 10% and 50%.

A sharp electron diffraction pattern was observed with respect to the contained substance, so the contained substance was highly crystalline. TEM observation revealed that the crystallinity ratio of the contained substance (the ratio of the area of a TEM image of the crystalline iron carbide to the area of a TEM image of the range filled with the iron carbide or iron) was approximately 100%.

TEM observation also revealed that the average filling proportion of the iron carbide or carbon present in the internal spaces of the multi-walled carbon nanotubes of the numerous iron-carbon composites was 20% (an average value for the carbonaceous material). The R value calculated based on X-ray diffraction in the same manner as in Example 1 was 0.38.

Test Example 1

(a) The nanoflake carbon tubes containing iron carbide (iron-carbon composites) obtained in Example 1 were tested for electron emission characteristics.

Specifically, a cathode substrate was prepared by depositing platinum by sputtering to a thickness of 2 $\mu$m on a silicon substrate measuring 2×2 cm.

On the other hand, an anode electrode was manufactured by applying a phosphor ($Y_2O_3$:Eu phosphor) to a transparent electrode (ITO (Indium Tin Oxide)) to a thickness of 10 μm.

The iron-carbon composites of Example 1 (5 mg) were dispersed in 5 ml of ethanol, and the resulting dispersion was applied dropwise to the cathode substrate and dried, yielding an electron emitter of the invention, namely a cathode substrate on which a thin film of electron emitting material consisting of the above-mentioned nanoflake carbon tubes containing iron carbide was formed.

Figure 11:
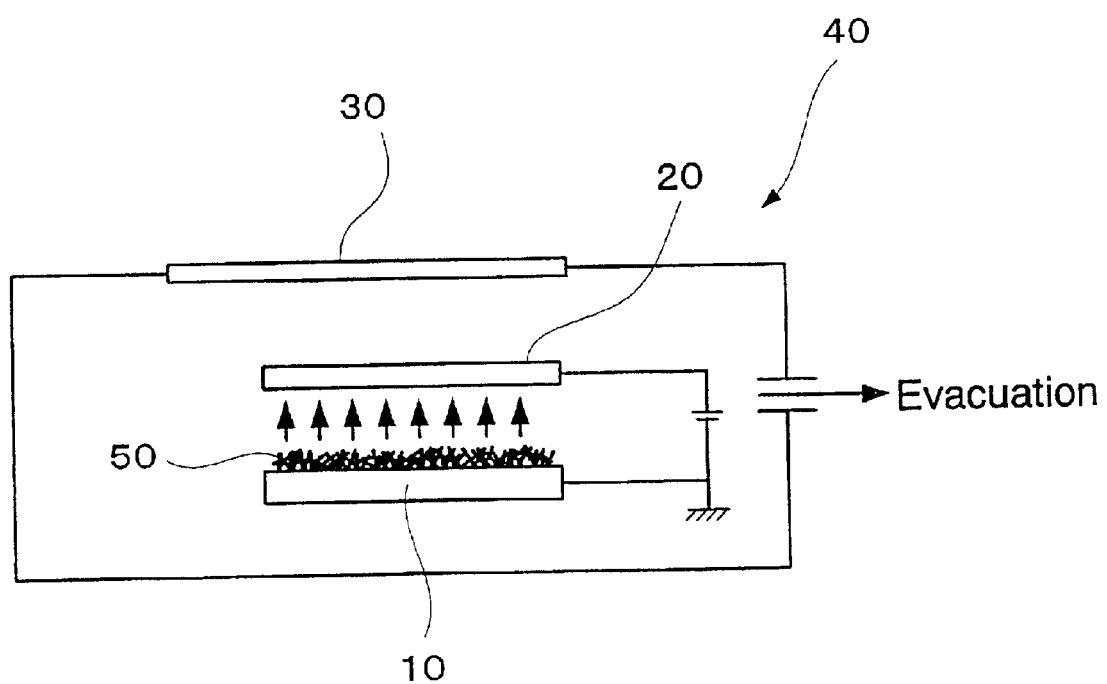
FIG. 11 is a schematic view of the measurement apparatus used for confirming the electron emitting characteristics in Test Examples 1 and 2 and Comparative Test Example 1.

Then, as shown in FIG. 11, in a vacuum vessel 40 that had a transparent glass plate 30 fit therein for observing light emission, the anode electrode 20 obtained above was disposed parallel, with a spacing of 300 μm, to the above cathode substrate 10 coated with the electron emitting material 50. Then, the pressure in the vessel was adjusted to $1 \times 10^{-4}$ Pa, and electron emission was confirmed by applying a voltage between the cathode substrate 10 and the anode electrode 20.

Consequently, the current density of 10 mA/cm² was obtained under an electric field of 0.9 V/μm, and red light emission was observed from the anode electrode, and not less than 10000 electron emission points/cm² could be observed.

Test Example 2

A cathode substrate coated with iron carbide-containing nanoflake carbon tubes was obtained in the same manner as in Test Example 1 except that a 2×2 cm glass substrate on which platinum had been deposited by sputtering to a thickness of 2 μm was used as the cathode substrate, and a samarium-cobalt-based permanent magnet was disposed at the bottom of said cathode substrate in such a manner that the magnetic field lines were perpendicular to said cathode substrate, and the ethanol dispersion of iron carbide-containing nanoflake carbon tubes obtained in Example 1 was applied dropwise to the cathode substrate and dried.

The resulting cathode substrate coated with iron carbide-containing nanoflake carbon tubes was evaluated for electron emission characteristics in the same manner as in Test Example 1. As a result, it was confirmed that the magnitude of the electric field required for obtaining a current density of 10 mA/cm² was 0.7 V/μm.

This improvement in electron emission characteristics shows that the above iron carbide-containing carbon nanotubes were at least in part oriented in the direction perpendicular to the cathode substrate or a similar direction by the action of the magnetic field of said permanent magnet.

Comparative Test Example 1

(a) Iron carbide-containing nanoflake carbon tubes (10 mg) obtained in the same manner as in Example 1 were dispersed in 20 ml of 10 N hydrochloric acid, and the dispersion was stirred for 3 hours at room temperature. A powder obtained by filtration was washed with 100 ml of distilled water and 100 ml of ethanol to remove the iron carbide contained in the internal spaces of the tubes, yielding hollow nanoflake carbon tubes.

(b) Electron emission was confirmed in the same manner as in Test Example 1 using said hollow nanoflake carbon tubes. Consequently, application of an electric field of 4.5 V/μm was required to obtain a current density of 10 mA/cm².

INDUSTRIAL APPLICABILITY

The present invention provides the following pronounced effects.

With the preparation process of the present invention, an iron-carbon composite having a novel structure in which 10 to 90% of the internal space defined by the wall composed of carbon is filled with iron carbide or iron can be obtained in a large quantity in a high yield by a simple procedure.

The obtained iron-carbon composite is clearly different in structure from known materials in which iron is present at the tip of carbon nanotubes, in that iron carbide or iron is contained in 10 to 90% of the internal space, and is a novel material having novel and unique properties based on a unique structure.

Also, since a metal is contained in the space defined by a graphite wall that has excellent durability, the iron-carbon composite of the present invention can be used as a magnetic material or molecular magnet or as a semi-permanent conductor or molecular electrically conducting wire that undergoes almost no deterioration in characteristics.

The iron-carbon composite of the present invention is therefore useful as electron emitting material as mentioned above, and also extremely useful as a material that gradually releases iron, a magnetic recording material, a sliding material, conductive fibrils, a magnetic material, a magnetic fluid, a superconducting material, a wear-resistant material, a semiconductor material, and so forth.

Also, rather than all of the space inside the carbon tube being filled with the contained iron carbide or iron, 10 to 90% of this space is filled therewith in the iron-carbon composite of the present invention, and therefore its production is easy, and compared to materials composed solely of carbon nanotubes, it is advantageous in that electrical conductivity is higher, magnetism can also be imparted, and nano-size quantum effects can also be anticipated.

Further, because a material in which 10 to 90% of the internal space of the carbon tube is filled with iron carbide or iron can be prepared, the electrical characteristics, magnetic characteristics, specific gravity, and other such properties can be controlled by selecting a carbonaceous material containing iron-carbon composites of the present invention having a particular filling proportion.

As for specific gravity, in compounding with other substances, composites with a filling proportion of 100%, that is, those containing iron or other metal over the entire lengths of the carbon tubes, may possess an exceedingly high specific gravity because of the contained metal, and therefore it would be difficult to disperse them in other substances. However, the iron-carbon composite of the present invention makes it easier to obtain a uniform mixture because the amount of contained metal can be reduced to a range of 10 to 90%.

In particular, the iron-carbon composite composed of nanoflake carbon tube and iron carbide or iron according to the present invention has the following advantages.

(a) There are many electron emitting points. Electron emission is likely to occur from the edges of graphene sheets as well, and this is advantageous from the standpoint of obtaining a high current density.

(b) It is highly graphitic, and therefore have excellent service life.

(c) It has good compatibility with pastes. If a material is highly graphitic, it tends to have poor compatibility with solvents and/or paste agents in the production of a paste. However, the iron-carbon composite composed of nanoflake carbon tube and iron carbide or iron is easy to use in preparing a paste, presumably because of the edge effect of the graphene sheets.

(d) Heat radiation is good.

(e) The structure is easy to control. Because the side wall is in a flake or papier-mâché-like or patchwork form, cutting, processing, surface modification and other structural control is easy.

(f) The material is flexible. Flexibility is imparted because the side wall is in a flake or papier-mâché-like or patchwork form, so rigidity and impact resistance can both be achieved when it is used for composite materials and the like.

(g) As shown in Test Example 1, the material can achieve necessary current density under a low electric field. Especially, as shown in Test Example 2, the necessary current density is achieved under a lower electric field by electron emitters prepared by orienting, on an electrode substrate, iron or iron carbide-containing nanoflake carbon tubes or iron or iron carbide-containing nested multi-walled carbon nanotubes, which form the electron emitting material of the present invention. Therefore, by the use of the electron emitting material of the present invention, self-luminous flat panel displays can be achieved.

What is claimed is:

1. An iron-carbon composite composed of (a) nanoflake carbon tube and (b) iron carbide or iron, the iron carbide or iron filling 10 to 90% of the internal space of the nanoflake carbon tube.

2. The iron-carbon composite according to claim 1, which has a straight shape, an outside diameter of 1 to 100 nm and a carbon wall thickness of 49 nm or less, the carbon wall thickness being substantially uniform over the entire length, and has an aspect ratio L/D of 5 to 10000 wherein L is the length and D is the outside diameter.

3. The iron-carbon composite according to claim 1 or 2, wherein the mean spacing between the hexagonal carbon layers (d002) is 0.34 nm or less, as determined by applying X-ray diffractometry to the wall of the nanoflake carbon tube that makes up the iron-carbon composite.

4. The iron-carbon composite according to claim 1, wherein when the nanoflake carbon tube is viewed in the lengthwise direction by a transmission electron microscope, numerous substantially linear graphene sheet images are arranged in layers substantially parallel to the lengthwise direction of the iron-carbon composite, the length of the individual substantially linear graphene sheet images being about 2 to 500 nm.

5. An electron emitting material comprising the iron-carbon composites of claim 1.

6. An electron emitter comprising an electrode substrate and a thin film of electron emitting material comprising the iron-carbon composites of claim 1 and formed on the electrode substrate.

7. The electron emitter according to claim 6, wherein the iron-carbon composites are oriented on the electrode substrate.

8. An electron emitter comprising an electrode substrate and a thin film of electron emitting material comprising the carbonaceous material of claim 1 and formed on the electrode substrate.

9. The electron emitter according to claim 8, wherein the iron-carbon composites are oriented on the electrode substrate.

10. A carbonaceous material comprising iron-carbon composites composed of (a) nanoflake carbon tubes and (b) iron carbide or iron, the iron carbide or iron filling 10 to 90% of the internal spaces of the nanoflake carbon tubes.

11. The carbonaceous material according to claim 10, wherein the ratio R of Ia/Ib is 0.35 to 5 as determined by powder X-ray diffractometry in which the carbonaceous material is irradiated with CuKa X-ray over an irradiation area of at least 25 mm$^2$ per mg of the carbonaceous material, wherein Ia is the integrated intensity of the peak which has the strongest integrated intensity among the peaks appearing in the range of $40°<2\theta<50°$ assigned to the iron or iron carbide contained in the nanoflake carbon tubes, and Ib is the integrated intensity of the peak appearing in the range of $26°<2\theta<27°$ assigned to the mean spacing between the hexagonal carbon layers (d002) of the nanoflake carbon tubes.

12. The carbonaceous material according to claim 10 or 11, wherein the iron-carbon composites have straight shapes, outside diameters in the range of 1 to 100 nm and carbon wall thicknesses in the range of 49 nm or less, the carbon wall thicknesses being substantially uniform over the entire lengths, and have aspect ratios L/D in the range of 5 to 10,000, wherein L is the length and D is the outside diameter.

13. The carbonaceous material according to claim 10 or 11, wherein the means spacing between the hexagonal carbon layers (d002) is 0.34 nm of less, as determined by applying X-ray diffactometry to the walls of the nanoflake carbon tubes that make up the iron-carbon composites.

14. The carbonaceous material according to claim 10, wherein when the nanoflake carbon tube is viewed in the lengthwise direction by a transmission electron microscope, numerous substantially linear graphene sheet images are arranged in layers substantially parallel to the lengthwise direction of the iron-carbon composite, the length of the individual substantially linear graphene sheet images being about 2 to 500 nm.

15. An electron emitting material comprising the carbonaceous of claim 10.

16. A process for preparing a carbonaceous material comprising iron-carbon composites composed of (a) carbontubes selected from the group consisting of nanoflake carbon tubes and nested multi-walled carbon nanotubes and (b) iron carbide of iron, wherein 10 to 90% of the internal spaces of the carbon filled with the iron carbide or iron, said process comprising the steps of:

(1) heating an iron halide to a temperature of 600 to 900° C. in a reaction furnace in which the pressure has been adjusted to $10^{-5}$ Pa to 200 kPa in an inert gas atmosphere and the oxygen concentration in the reaction furnace has been adjusted such that the ratio B/A is $1 \times 10^{-10}$ to $1 \times 10^{-1}$, wherein A is the reaction furnace volume (liters) and B is the oxygen quantity (Ncc); and (2) introducing an inert gas to the reaction furnace, and at a pressure of between $10^{-5}$ Pa and 200 kPa, introducing a pyrolyzable carbon source and performing a heat treatment at 600 to 900° C.

17. The process according to claim 16, which comprises, after the heat treatment in step (2), cooling the reaction furnace to 500° C. at a rate of 50 to 2000° C./h to thereby produce a carbonaceous material comprising iron-carbon composites composed of nanoflake carbon tubes and iron carbide or iron that fills to 10 to 90% of the internal spaces of the tubes.

18. The process according to claim 16, wherein the heat treatment in step (2) is performed in the presence of an organic iron complex.

19. The process according to claim 18, wherein the organic iron complex is ferrocene or an iron carbonyl complex.

20. The process according to any one of claims 16 to 19, wherein the iron halide is an iron chloride.

21. The process according to claim 20, wherein the iron chloride is at least one member selected from the group consisting of $FeCl_2$, $FeCl_3$, $FeCl_2 \cdot 4H_2O$ and $FeCl_3 \cdot 6H_2O$.

22. The process according to any one of claims 16 to 19, wherein the pyrolyzable carbon source is at least one member selected from the group consisting of aromatic hydrocarbons having 6 to 12 carbon atoms, saturated aliphatic hydrocarbons having 1 to 10 carbon atoms, and unsaturated aliphatic hydrocarbons having 2 to 5 carbon atoms.

* * * * *

UNITED STATES PATENT AND TRADEMARK OFFICE
CERTIFICATE OF CORRECTION

PATENT NO. : 6,835,330 B2
DATED : December 28, 2004
INVENTOR(S) : Hitoshi Nishino et al.

Page 1 of 1

It is certified that error appears in the above-identified patent and that said Letters Patent is hereby corrected as shown below:

Title page,
Insert Item -- Related U.S. Application Data
 [63] Continuation application of PCT application No. PCT/JP02/07340 filed July 19, 2002. --

Column 1,
Line 5, insert -- Cross Reference to Related Application
The subject application is a continuation application of PCT application No. PCT/JP02/07340 filed July 19, 2002, which claims priority of Japanese Patent Application Serial No. 2002-72937 filed March 15, 2002. --

Column 26,
Line 6, change "claim 1" to -- claim 10 --;
Line 16, the ratio "1a/1b" should be -- Ia to Ib --;
Line 20, the term "1a" should be -- Ia --;
Line 23, the term "1b" should be -- Ib --;
Line 37, the term "means" should be -- mean --;
Line 38, the term "of" should be -- or --;
Line 50, insert -- material -- before "of";
Lines 52-53, delete "carbon-tubes selected from the group consisting of";
Line 54, delete "and nested multi-walled carbon nanotubes";
Line 55, change "of" (first occurrence) to -- or --;
Line 56, change "carbon" to -- nanoflake carbon tubes are --;

Column 27,
Line 12, delete "to".

Signed and Sealed this

Twenty-eighth Day of June, 2005

JON W. DUDAS
*Director of the United States Patent and Trademark Office*